United States Patent
Ashizawa et al.

(10) Patent No.: US 6,867,755 B2
(45) Date of Patent: Mar. 15, 2005

(54) DEVICE AND METHOD FOR DRIVING EL DEVICE

(75) Inventors: Shouzou Ashizawa, Shizuoka (JP); Wataru Oishi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 300 days.

(21) Appl. No.: 09/844,275

(22) Filed: Apr. 30, 2001

(65) Prior Publication Data

US 2002/0003517 A1 Jan. 10, 2002

(30) Foreign Application Priority Data

Apr. 28, 2000 (JP) .................................... P. 2000-131064

(51) Int. Cl.$^7$ ................................................. G09G 3/30
(52) U.S. Cl. ...................................................... 345/76
(58) Field of Search .............................. 345/76, 79, 87, 345/80, 103, 208; 315/169.3, 169.4; 323/282; 361/681; 363/20

(56) References Cited

U.S. PATENT DOCUMENTS

| | | | | |
|---|---|---|---|---|
| 4,208,869 A | * | 6/1980 | Hanaoka | 368/84 |
| 4,595,920 A | * | 6/1986 | Runyan | 345/76 |
| 4,633,141 A | * | 12/1986 | Weber | 315/307 |
| 4,982,183 A | * | 1/1991 | Flegal et al. | 345/79 |
| 5,032,829 A | * | 7/1991 | Shoji et al. | 345/79 |
| 5,206,631 A | * | 4/1993 | Yamamoto et al. | 345/79 |
| 5,532,712 A | * | 7/1996 | Tsuda et al. | 345/87 |
| 5,559,402 A | * | 9/1996 | Corrigan, III | 315/169.3 |
| 5,581,274 A | * | 12/1996 | Tagawa | 345/104 |
| 5,583,424 A | * | 12/1996 | Sato et al. | 323/282 |
| 5,621,623 A | * | 4/1997 | Kuriyama et al. | 363/20 |
| 5,657,459 A | * | 8/1997 | Yanagisawa et al. | 361/681 |
| 5,670,864 A | * | 9/1997 | Marx et al. | 323/211 |
| 5,694,030 A | * | 12/1997 | Sato et al. | 323/282 |
| 5,847,516 A | * | 12/1998 | Kishita et al. | 315/169.3 |
| 5,880,705 A | * | 3/1999 | Onyskevych et al. | 345/80 |
| 6,040,827 A | * | 3/2000 | Shiina et al. | 345/208 |
| 6,064,158 A | * | 5/2000 | Kishita et al. | 315/169.3 |
| 6,157,138 A | * | 12/2000 | Andersson | 315/169.3 |
| 6,288,496 B1 | * | 9/2001 | Suzuki et al. | 315/169.3 |
| 6,522,319 B1 | * | 2/2003 | Yamazaki | 345/103 |
| 6,556,260 B1 | * | 4/2003 | Itou et al. | 349/69 |
| 6,703,792 B2 | * | 3/2004 | Kawada et al. | 315/169.4 |

FOREIGN PATENT DOCUMENTS

| | | | | |
|---|---|---|---|---|
| JP | 5-21160 | | 1/1993 | ........... H05B/33/08 |
| JP | 5-50700 | | 7/1993 | ........... H05B/33/08 |
| JP | 6-36875 | | 2/1994 | ........... H05B/33/08 |
| JP | 09-054565 | * | 2/1997 | |
| JP | 1997-198792 | * | 2/1997 | |
| JP | 2000-047638 | * | 2/2000 | |

OTHER PUBLICATIONS

Patent Abstract of Japan, 05–021160, Jan. 29, 1993.
Abstract, 05–50700, Jul. 2, 1993.
Patent Abstract of Japan, 06–036875, Feb. 10, 1994.

* cited by examiner

*Primary Examiner*—Vijay Shankar
*Assistant Examiner*—Prabodh Dharia
(74) *Attorney, Agent, or Firm*—Sughrue Mion, PLLC

(57) ABSTRACT

The EL device driving device comprising a plurality of EL devices having two electrodes, a first EL driving IC having a plurality of output terminals connected to one electrodes of the plurality of EL devices and an input terminal, a second EL driving IC having a plurality of output terminals connected to the other electrodes of the plurality of EL devices and an input terminal, a first AC power supply for supplying an AC voltage of sinusoidal waveform, with one electrode being connected to the input terminal of the first EL driving IC, and a second AC power supply for supplying an AC voltage of sinusoidal waveform having the same waveform as the AC voltage supplied from the first AC supply, and shifted in phase 180 degrees, with one electrode being connected to the input terminal of the second EL driving IC.

35 Claims, 11 Drawing Sheets

DEVICE AND METHOD FOR DRIVING EL DEVICE

BACKGROUND OF THE INVENTION

1. Technical of the Invention

The present invention relates to a device and method for driving an EL device, and more particularly to a device and method for driving an EL device having a circuit configuration with an output transistor and a diode connected in parallel.

2. Related Art

An EL device (Electroluminescence device) has a structure like a condenser of one kind in which an illuminant having a special fluorescent material dispersed and contained in a dielectric material is sandwiched between two sheets of electrodes. When an AC voltage is applied between two sheets of electrodes for this EL device, an AC electric field is applied on the fluorescent material of the illuminant, so that the fluorescent material emits a light and the EL device is lightened. Generally, it is well known that the luminance and the luminance half life of the EL device depend on the magnitude and frequency of the applied voltage. In order to assure that this EL device has a longer life of the luminance, it is required that the AC voltage without superposition of direct current, i.e., the AC voltage having the same amplitude in positive and negative regions maybe applied between both electrodes of the EL device.

Generally, when controlling a plurality of EL devices, a drive circuit for the EL device is configured, as shown in FIG. 13 or 14. In FIG. 13, the EL devices (L1, L2, . . . , Ln) are connected in series to the relay switches (S1, S2, . . . , Sn), respectively, and to an AC power supply 39 for supplying an AC voltage of sinusoidal wave without superposition of direct current to make up a closed circuit. FIG. 14 shows a circuit configuration in which the TRIACs (T1, T2, . . . , Tn) are employed instead of the relay switches (S1, S2, . . . , Sn) in FIG. 13. The relay switches and the TRIACs can turn on or off the alternating current.

However, since the switches such as relay switches and TRIACs are large in size, the related circuit configuration is unsuitable for the EL devices mostly used to contribute to the miniaturization of the device, making use of the advantages of thin type and high luminance, and remarkably unfavorable particularly when a number of EL devices are driven.

To form an AC power supply circuit as a semiconductor integrated circuit, a circuit configuration as shown in FIG. 15, for example, is considered. In FIG. 15, both electrodes of an EL device L1 are connected to one electrodes of bipolar transistors (31 to 34), the other electrodes of bipolar transistors (31 to 34) being connected to a DC power supply and a ground potential point. The transistors (31, 33) connected to the DC power supply and the transistors (32, 34) connected to the ground potential point are turned on and off alternately to apply an AC voltage on the EL device. However, the AC voltages (Vx, Vy) applied to both electrodes of the EL device have a rectangular waveform, as shown in FIG. 16. If the EL device is driven by the AC voltage of this rectangular wave, the load on the EL device is increased owing to a sudden change in the applied voltage, unfavorably resulting in a shorter life of the EL device.

SUMMARY OF THE INVENTION

The present invention has been achieved in the light of the aforementioned problems, and it is an object of the invention to provide an EL device driving device that can drive an EL device with a small and cheap circuit configuration, without shortening the life.

It is another object of the invention to provide an EL device driving method that can drive an EL device with a small and cheap circuit configuration, without shortening the life.

To accomplish the above object, a first feature of the invention is an EL device driving device comprising, an EL device having two electrodes;

a first EL driving IC having an output terminal connected to one electrode of the EL device, an input terminal, and means for turning on or off an alternating current flowing between the output terminal and the input terminal;

a second EL driving IC having an output terminal connected to the other electrode of the EL device, an input terminal, and means for turning on or off an alternating current flowing between the output terminal and the input terminal;

a first AC power supply for supplying an AC voltage, with one electrode being connected to the input terminal of the first EL driving IC, and the other electrode being connected to a ground potential point; and a second AC power supply for supplying an AC voltage having the same waveform as the AC voltage supplied from the first AC supply, and shifted in phase 180 degrees, with one electrode being connected to the input terminal of the second EL driving IC, and the other electrode being connected to the ground potential point.

Herein, two electrodes of the EL device are opposed to each other, the output terminals of the first and second EL driving ICs are respectively connected to both electrodes of the EL device, the first AC power supply is connected to the input terminal of the first EL driving IC, and the second AC power supply is connected to the input terminal of the second EL driving IC. Accordingly, an AC voltage supplied from the first AC power supply is applied via a switching element composed of an output transistor and a diode connected in parallel to one electrode of the EL device, and an AC voltage supplied from the second AC power supply is applied via a switching element composed of an output transistor and a diode connected in parallel to the other electrode of the EL device. Namely, the AC voltage is applied between both electrodes of the EL device, employing the first and second AC power supplies for supplying the AC voltages having the same waveform and shifted in phase 180 degrees.

According to the first feature of the invention, the alternating current can be turned on or off by the switching element composed of the output transistor and the diode connected in parallel to the output transistor. Accordingly, the EL device can be driven employing the AC voltage, without shortening the life, with an integrated (IC) switch for driving the EL device. Moreover, the general-purpose IC containing the switch for this EL driving IC can be utilized. Accordingly, it is possible to provide the EL device driving device that can drive the EL device with a small and cheap circuit configuration, without shortening the life.

As used in the first feature of the invention, the "first EL driving IC" has desirably the output transistor with one electrode connected to the output terminal of the first EL driving IC and the other electrode connected to the input terminal of the first EL driving IC, and the diode connected in parallel to this output transistor, as the "means for turning on or off the alternating current flowing between the output terminal and the input terminal". Similarly, the "second EL driving IC" has desirably the output transistor with one electrode connected to the output terminal of the second EL driving IC and the other electrode connected to the input terminal of the second EL driving IC, and the diode connected in parallel to this output transistor, as the "means for turning on or off the alternating current flowing between the output terminal and the input terminal". Further, the "first EL driving IC" has preferably a shift register circuit for receiving and accumulating the control data from the outside and a latch circuit connected to a control electrode of the "output transistor" for holding the control data accumulated in the shift register circuit. Similarly, the "second EL driving IC" has preferably a shift register circuit for receiving and accumulating the control data from the outside and a latch circuit connected to a control electrode of the "output transistor" for holding the control data accumulated in the shift register circuit.

Herein, the "output transistor" is desirably a bipolar transistor or a field effect transistor. The field effect transistor may be a junction type field effect transistor or a MOS type field effect transistor. The "diode" is connected in parallel between emitter and collector in the case of the bipolar transistor, or between source and drain in the case of the field effect transistor. A forward direction of the diode is defined as one from the emitter to the collector in the case of the npn bipolar transistor, or from the source to the drain in the case of the n-channel MOS type field effect transistor. When the polarity of these transistors is reversed, the forward direction of the diode is also reversed. The "control electrode" means the base electrode in the case of the bipolar transistor, or the gate electrode in the case of the field effect transistor.

The "first AC power supply" and the "second AC power supply" can preferably supply an AC voltage with a frequency from tens to 1000 Hz. More preferably, the AC power supply can supply an AC voltage with an amplitude of 50V and a frequency of 400 Hz. Further, the "first AC power supply" and the "second AC power supply" may be a household power supply (100 Vrms, 60 Hz). Further, the AC power supply may generate an AC voltage of predetermined waveform employing an operational amplifier and a low frequency amplifier.

Also, in the first feature of the invention, a plurality of "EL devices" are provided, and the "first EL driving IC" and the "second EL driving IC" may have a plurality of output terminals and a plurality of means for turning on or off the alternating current corresponding to the plurality of EL devices And the plurality of output terminals for the "first EL driving IC" are connected to one electrodes of the plurality of "EL devices", respectively, and the means for turning on or off the alternating current of the first EL driving IC may turn on of off the alternating current flowing between each of the plurality of output terminals and the input terminal for the "first EL driving IC". Similarly, the plurality of output terminals for the "second EL driving IC" are connected to the other electrodes of the plurality of "EL devices", respectively, and the means for turning on or off the alternating current of the second EL driving IC may turn on of off the alternating current flowing between each of the plurality of output terminals and the input terminal for the "second EL driving IC".

A second feature of the invention is an EL device driving device comprising, an EL device having two electrodes;

an EL driving IC having an output terminal connected to one electrode of the EL device, an input terminal, and means for turning on or off an alternating current flowing between the output terminal and the input terminal;

a first AC power supply for supplying an AC voltage, with one electrode being connected to the other electrode of the EL driving IC, and the other electrode being connected to a ground potential point; and a second AC power supply for supplying an AC voltage having the same waveform as the AC voltage supplied from the first AC supply, and shifted in phase 180 degrees, with one electrode being connected to the input terminal of the EL driving IC, and the other electrode being connected to the ground potential point.

According to the second feature of the invention, the alternating current can be turned on or off by the switching element composed of the output transistor and the diode connected in parallel to the output transistor. Accordingly, the EL device can be driven employing the AC voltage without superposition of direct current, without shortening the life, and the switch for driving the EL device can be integrated (IC). Moreover, the general-purpose IC containing the switch for this EL driving IC can be utilized. Furthermore, owing to a circuit configuration where the EL driving IC is connected to only one electrode of the EL device, the area for making the circuit can be suppressed to about one-half to simplify the circuit configuration. Accordingly, it is possible to provide the EL device driving device that can drive the EL device with a small and cheap circuit configuration, without shortening the life.

As used in the second feature of the invention, the "EL driving IC" has desirably a plurality of output transistors with one electrode connected to the output terminal of the EL driving IC and the other electrode connected to the input terminal of the EL driving IC, and the diodes connected in parallel to the output transistors. Further, the "EL driving IC" has preferably a shift register circuit for receiving and accumulating the control data from the outside and a latch circuit connected to a control electrode of the "output transistor" for holding the control data accumulated in the shift register circuit.

Herein, the "output transistor" is desirably a bipolar transistor or a field effect transistor.

The "first AC power supply" and the "second AC power supply" can preferably supply an AC voltage with a frequency from tens to 1000 Hz. More preferably, the AC power supply can supply an AC voltage with an amplitude of 50V and a frequency of 400 Hz.

Also, in the second feature of the invention, a plurality of "EL devices" are provided, and the "EL driving IC" may have a plurality of output terminals and a plurality of means for turning on or off the alternating current corresponding to the plurality of EL devices. And the plurality of output terminals for the "EL driving IC" are connected to one electrodes of the plurality of "EL devices", respectively, one electrode of the "first AC power supply" being connected to the other electrodes of the "EL driving elements", and the means for turning on or off the alternating current of the EL driving IC may turn on of off the alternating current flowing between each of the plurality of output terminals and the input terminal for the "EL driving IC".

A third feature of the invention is an EL device driving device comprising, an EL device having two electrodes;

an EL driving IC having an output terminal connected to one electrode of the EL device, an input terminal connected to a ground potential point, and means for turning on or off an alternating current flowing between the output terminal and the input terminal; and an AC power supply for supplying an AC voltage without superposition of direct current, with one electrode being connected to the other electrode of the EL driving IC, and the other electrode being connected to the ground potential point.

According to the third feature of the invention, the alternating current can be turned on or off by the switching element composed of the output transistor and the diode connected in parallel to the output transistor. Accordingly, the EL device can be driven employing the AC voltage without superposition of direct current, without shortening the life, and the switch for driving the EL device can be integrated (IC). Moreover, the general-purpose IC containing the switch for this EL driving IC can be utilized. Furthermore, owing to a circuit configuration where the EL driving IC is connected to only one electrode of the EL device, the area for making the circuit can be suppressed to about one-half to simplify the circuit configuration. Furthermore, since the EL driving IC can be operated on the ground potential, there is no need of the electrical insulation employing the photo-coupler or the insulating transformer to receive the data signal, the clock signal and the latch signal from the outside. Also, only one AC power supply maybe employed. Accordingly, it is possible to provide the EL device driving device that can drive the EL device with a small and cheap circuit configuration, without shortening the life.

As used in the third feature of the invention, the "EL driving IC" has desirably the output transistor with one electrode connected to the output terminal of the EL driving IC and the other electrode connected to the input terminal of the EL driving IC, and the diode connected in parallel to the output transistor.

Herein, the "output transistor" is desirably a bipolar transistor or a field effect transistor.

The "AC power supply" is preferably able to supply an AC voltage with a frequency from tens to 1000 Hz. More preferably, the AC power supply is able to supply an AC voltage with an amplitude of 100V and a frequency of 400 Hz.

Also, in the third feature of the invention, a plurality of "EL devices" are provided, and the "EL driving IC" may have a plurality of output terminals and a plurality of means for turning on or off the alternating current corresponding to the plurality of EL devices. And the plurality of output terminals for the "EL driving IC" are connected to one electrodes of the plurality of "EL devices", respectively, one electrode of the "AC power supply" being connected to the other electrodes of the "EL driving elements", and the means for turning on or off the alternating current of the EL driving IC may turn on of off the alternating current flowing between each of the plurality of output terminals and the input terminal for the "EL driving IC".

A fourth feature of the invention is an EL device driving device comprising, an EL device having two electrodes;

an AC power supply for supplying an AC voltage, with one electrode being connected to one electrode of the EL device, and the other electrode being connected to a ground potential point;

a first energizing circuit for energizing a first diode connected to the other electrode of the EL device to pass current in a direction from the EL device to the AC power supply;

a second energizing circuit for energizing a second diode connected to the other electrode of the EL device to pass current in a direction from the AC power supply to the EL device; and an energizing control circuit for turning on or off the first and second energizing circuits in synchronism with a positive or negative change in the AC voltage supplied from the AC power supply.

According to the fourth feature of the invention, the alternating current flowing through the EL device can be tuned on or off using the first and second energizing circuits having the diode for defining the energizing direction between the EL device and the AC power supply and the energizing control circuit for turning on or off them. Accordingly, the EL device can be driven employing the AC voltage, without shortening the life, and the switch for driving the EL device can be integrated (IC). Moreover, the general-purpose ICs containing the switch as this EL driving IC can be used. Accordingly, it is possible to provide the EL device driving device that can drive the EL device with a small and cheap circuit configuration and without shortening the life.

The "AC power supply" is preferably able to supply an AC voltage with a frequency from tens to 1000 Hz. More preferably, the AC power supply is able to supply an AC voltage with an amplitude of 100 Vrms and a frequency of 400 Hz.

Also, in the fourth feature of the invention, a plurality of "EL devices" may be provided, and a plurality of "first energizing circuits" and a plurality of "second energizing circuits" may be provided corresponding to the plurality of EL devices, respectively. And the "energizing control circuit" may be configured to turn on or off each of the plurality of first and second energizing circuits corresponding to the plurality of EL devices.

Further, in the fourth feature of the invention, one electrode of the "first diode" is connected to the other electrode of the "EL device", and the "first energizing circuit" has means for enabling the other electrode of the "first diode" to be at the ground potential when the first energizing circuit is turned on. On the other hand, one electrode of the "second diode" is connected to the other electrode of the "EL device", and the other electrode of the "second diode" is connected to the ground potential point.

Also, in the fourth feature of the invention, the "energizing control circuit" turns on the "first energizing circuit", and turns off the "second energizing circuit", while the AV voltage supplied from the "AC power supply" is at a negative potential, and turns off the "first energizing circuit", and turns on the "second energizing circuit", while the AV voltage supplied from the "AC power supply" is at a positive potential.

A fifth feature of the invention is an EL device driving method to lighten an EL device wherein when the AC voltage supplied from a first AC power supply is higher than the AC voltage supplied from a second AC power supply, with the same waveform as the AC voltage supplied from the first AC power supply and shifted in phase 180 degrees, a current flows from the first AC power supply through a diode within a first EL driving IC to one electrode of the EL device, and from the other electrode of the EL device through an output transistor in the on state within a second EL driving IC to the AC power supply; and when the AC voltage supplied from the first AC power supply is lower than the AC voltage supplied from the second AC power supply, a current flows from the second AC power supply through a diode connected in parallel to the output transistor within the second EL driving IC to the other electrode of the EL device, and from one electrode of the EL device through the output transistor in the on state connected in parallel to the diode within the first EL driving IC to the first AC power supply.

According to the fifth feature of the invention, the switching element for enabling the alternating current to pass can be constituted by the EL driving IC having the output transistor and the diode connected in parallel to the output transistor. Accordingly, the EL device can be driven employing the AC voltage without superposition of direct current, without shortening the life, and the switch for driving the EL device can be integrated (IC). Moreover, the general-purpose IC containing the switch for this EL driving IC can be utilized. Accordingly, it is possible to provide the EL device driving method that can drive the EL device with a small and cheap circuit configuration, without shortening the life.

A sixth feature of the invention is an EL device driving method to lighten an EL device wherein when the AC voltage supplied from a first AC power supply is higher than the AC voltage supplied from a second AC power supply, with the same waveform as the AC voltage supplied from the first AC power supply and shifted in phase 180 degrees, a current flows from the first AC power supply to one electrode of the EL device, and from the other electrode of the EL device through an output transistor in the on state within an EL driving IC to the second AC power supply; and when the AC voltage supplied from the first AC power supply is lower than the AC voltage supplied from the second AC power supply, a current flows from the second AC power supply through a diode connected in parallel to the output transistor within the EL driving IC to the other electrode of the EL device, and from one electrode of the EL device to the first AC power supply.

According to the sixth feature of the invention, the switching element for enabling the alternating current to pass can be constituted by the EL driving IC having the output transistor and the diode connected in parallel to the output transistor. Accordingly, the EL device can be driven employing the AC voltage without superposition of direct current, without shortening the life, and the switch for driving the EL device can be integrated (IC). Moreover, the general-purpose IC containing the switch for this EL driving IC can be utilized. Furthermore, owing to a circuit configuration where the EL driving IC is connected to only one electrode of the EL device, the area for making the circuit can be suppressed to about one-half to simplify the circuit configuration. Accordingly, it is possible to provide the EL device driving method that can drive the EL device with a small and cheap circuit configuration, without shortening the life.

A seventh feature of the invention is an EL device driving method to lighten an EL device wherein when the AC voltage without superposition of direct current supplied from an AC power supply is higher than a ground potential, a current flows from the AC power supply to one electrode of the EL device, and from the other electrode of the EL device through an output transistor in the on state within an EL driving IC to the ground potential point; and when the AC voltage supplied from the AC power supply is lower than the ground potential, a current flows from the ground potential point through a diode connected in parallel to the output transistor in the on state within the EL driving IC to the other electrode of the EL device, and from one electrode of the EL device to the AC power supply.

According to the seventh feature of the invention, the switching element for enabling the alternating current to pass can be constituted by the EL driving IC having the output transistor and the diode connected in parallel to the output transistor. Accordingly, the EL device can be driven employing the AC voltage without superposition of direct current, without shortening the life, and the switch for driving the EL device can be integrated (IC). Moreover, the general-purpose IC containing the switch for this EL driving IC can be utilized. Furthermore, owing to a circuit configuration where the EL driving IC is connected to only one electrode of the EL device, the area for making the circuit can be suppressed to about one-half to simplify the circuit configuration. Moreover, there is no need of the electrical insulation employing the photo-coupler or the insulating transformer to receive the data signal, the clock s signal and the latch signal from the outside. Only one AC power supply may be used. Accordingly, it is possible to provide the EL device driving method that can drive the EL device with a small and cheap circuit configuration, without shortening the life.

DESCRIPTION OF PREFERRED EMBODIMENT

Figure 1:
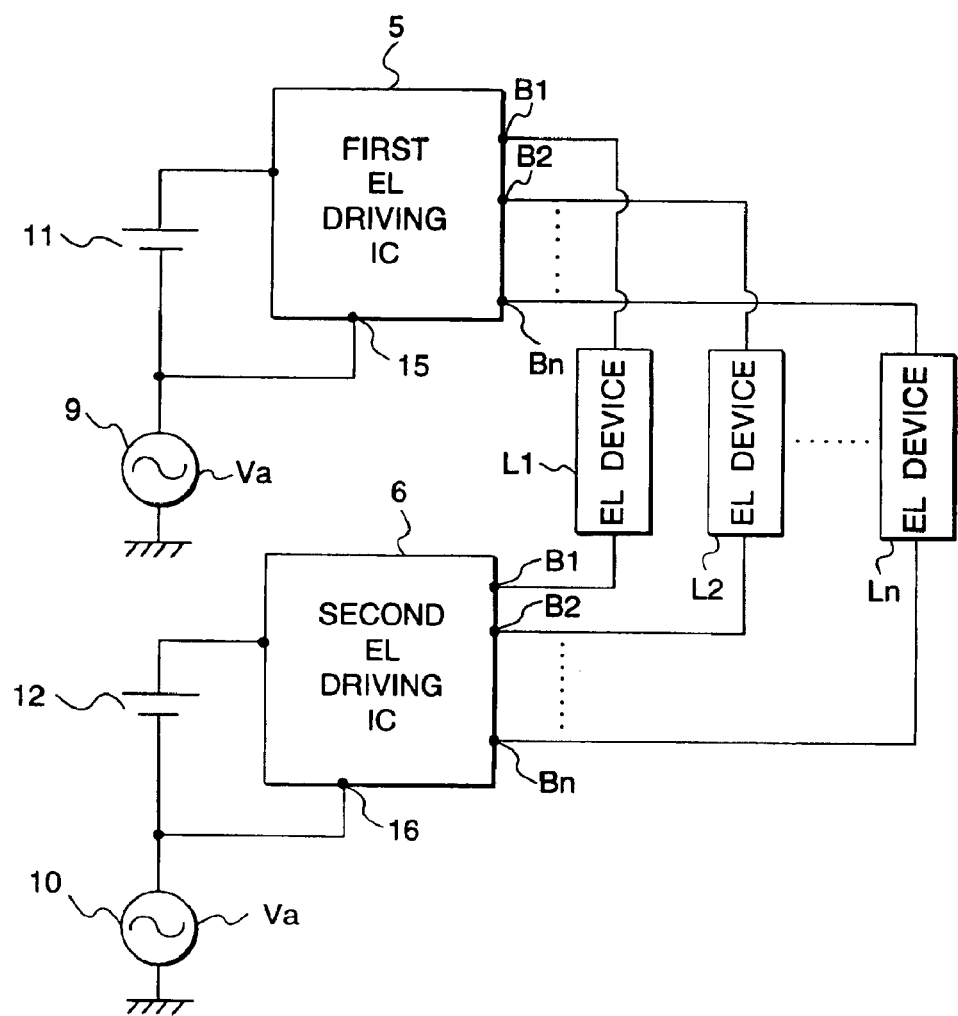
FIG. 1 is a circuit diagram showing the configuration of an EL device driving device according to a first embodiment of the invention.

The preferred embodiments of the present invention will be described below with reference to the drawings. In the drawings, like or the same parts are attached with like or the same numerals.

First Embodiment

FIG. 1 is a circuit diagram showing the configuration of an EL device driving device according to a first embodiment of the invention. As shown in FIG. 1, the EL device driving device comprises a plurality of EL devices (L1, L2, ..., Ln) having two electrodes, a first EL driving IC5 at least having a plurality of output terminals (B1, B2, ..., Bn) respectively connected to electrodes of the plurality of EL devices (L1, L2, ..., Ln) and an input terminal 15, a second EL driving IC6 at least having a plurality of output terminals (B1, B2, ..., Bn) connected to the other electrodes of the plurality of EL devices (L1, L2, ..., Ln) and an input terminal 16, a first AC power supply 9 for supplying an AC voltage of sinusoidal wave, with one electrode connected to the input terminal 15 of the first EL driving IC 5 and the other electrode connected to a ground potential point, and a second AC power supply 10 for supplying an AC voltage of sinusoidal wave having the same waveform as the AC voltage supplied by the first AC power supply 9 and shifted in phase 180 degrees, with one electrode connected to the input terminal 16 of the second EL driving IC6 and the other electrode connected to the ground potential point. In FIG. 1, a first DC power supply 11 supplies an electric power required for the operation of the first EL driving IC5, and a second DC power supply 12 supplies an electric power required for the operation of the second EL driving IC6.

Figure 2:
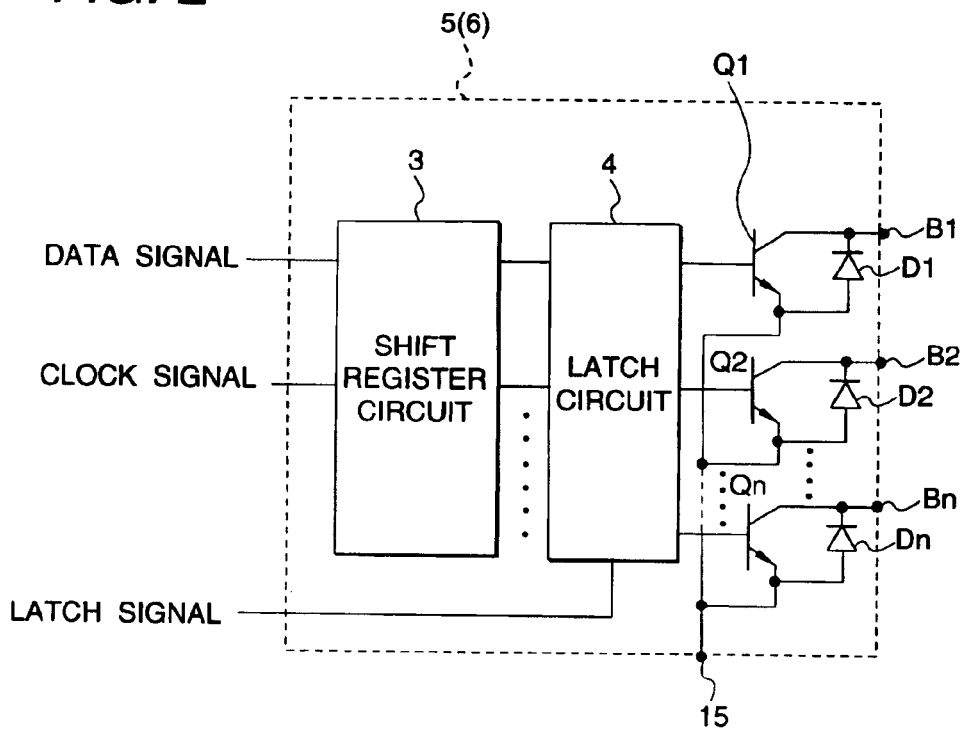
FIG. 2 is a circuit diagram showing the configuration of an EL driving IC as shown in FIG. 1 (No.1).

FIG. 2 shows a specific circuit configuration of the first and second EL driving ICs (5, 6). The circuits of the first and second EL driving ICs (5, 6) have the same configuration. As shown in FIG. 2, an EL driving IC5 (or 6) comprises a plurality of output transistors (Q1, Q2, ..., Qn), a plurality of diodes (D1, D2, ..., Dn) respectively connected in parallel to the plurality of output transistors (Q1, Q2, ..., Qn), a latch circuit 4 connected to the control electrodes of the plurality of output transistors (Q1, Q2, ..., Qn), and a shift register circuit 3 connected to the latch circuit 4. One electrodes of the plurality of output transistors (Q1, Q2, ..., Qn) are connected to a plurality of output terminals (B1, B2, ..., Bn), respectively, and the other electrodes are connected to the input terminal 15. The output transistors (Q1, Q2, ..., Qn), the diodes (D1, D2, ..., Dn), the latch circuit 4 and shift register circuit 3 correspond to a controller in claims.

A data signal for controlling the plurality of EL devices (L1, L2, ..., Ln) to be lightened is sent from the shift resister circuit 3. The control data is accumulated in the shift register circuit 3 in accordance with a clock signal synchronized with the data signal. The control data accumulated in the shift register circuit 3 is received into the latch circuit 4 which receives a latch signal and held. Each output transistor (Q1, Q2, ..., Qn) is turned on or off in accordance with the control data held in the latch circuit 4 connected to a control electrode of each output transistor (Q1, Q2, ..., Qn).

The output transistors may be preferably the bipolar transistors (Q1, Q2, ..., Qn) or the field effect transistors. The field effect transistors may be junction type field effect transistors or MOS type field effect transistors (F1, F2, ..., Fn). Diodes (D1, D2, ..., Dn) are connected in parallel between emitter and collector in the case of the bipolar transistors (Q1, Q2, ..., Qn), or between source and drain in the case of the field effect transistors. A forward direction of the diodes (D1, D2, ..., Dn) is defined as one from the emitter to the collector in the case of the npn bipolar transistors (Q1, Q2, ..., Qn), or from the source to the drain in the case of the n-channel MOS type field effect transistors (F1, F2, ..., Fn). When the polarity of these transistors is reversed, the forward direction of the diodes (D1, D2, ..., Dn) is also reversed. It is required here that the diodes (D1, D2, ..., Dn) of the first EL driving IC5 and the diodes (D1, D2, ..., Dn) of the second EL driving IC6 have the same forward direction. The control electrode means the base electrode in the case of the bipolar transistors (Q1, Q2, ..., Qn), or the gate electrode in the case of the field effect transistors (F1, F2, ..., Fn).

Figure 3:
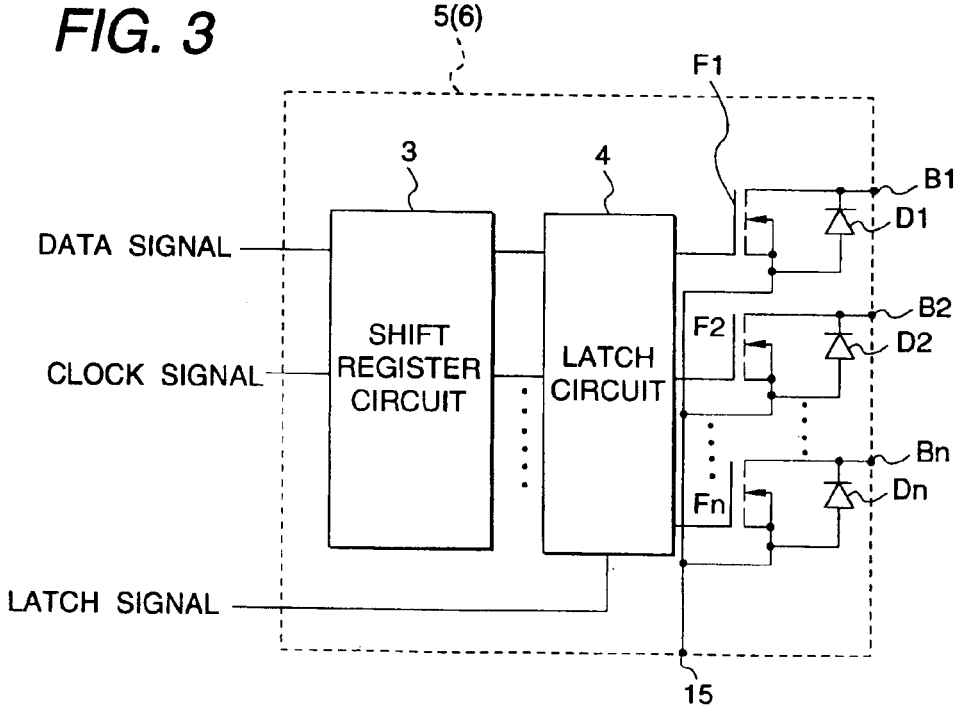
FIG. 3 is a circuit diagram showing the configuration of the EL driving IC as shown in FIG. 1 (No.2).

In FIG. 2, the output transistors use the npn bipolar transistors (Q1, Q2, ..., Qn) FIG. 3 shows a circuit configuration of the EL driving IC5 (or 6) in the case of employing the n-channel MOS type field effect transistors (F1, F2, ..., Fn), instead of the npn bipolar transistors (Q1, Q2, ..., Qn). The output transistors of either type can function as the switching device. In the first embodiment, the bipolar transistors (Q1, Q2, ..., Qn) are employed as the output transistors, and the forward direction of the diodes (D1, D2, ..., Dn) is defined as one from the input terminal 15 (or 16) to the output terminals (B1, B2, ..., Bn).

As shown in FIG. 1, the first EL driving IC5 operates on an AC voltage supplied from the first AC power supply 9 with respect to the ground potential. Similarly, the second EL driving IC6 operates on an AC voltage supplied from the second AC power supply 10 with respect to the ground potential. Accordingly, the shift register circuit 3 and the latch circuit 4 can receive the data signal, the clock signal and the latch signal from the outside through a photocoupler or an insulating transformer due to the necessity of electrical insulation.

Figure 4A:
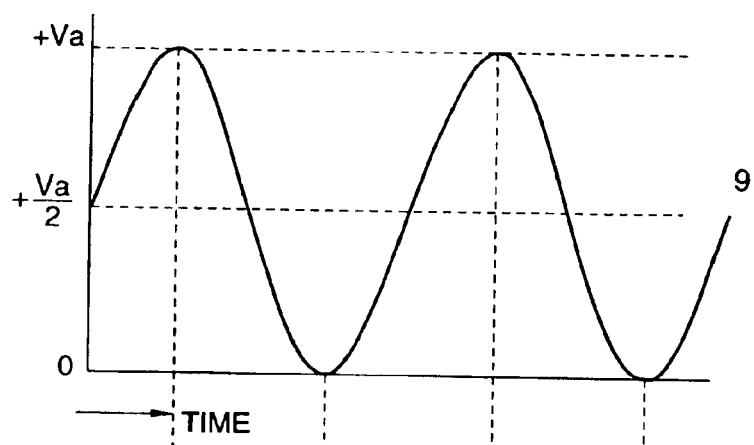
FIG. 4A is a chart showing a waveform of AC voltage supplied from a first AC power supply as shown in FIG. 1.
Figure 4B:
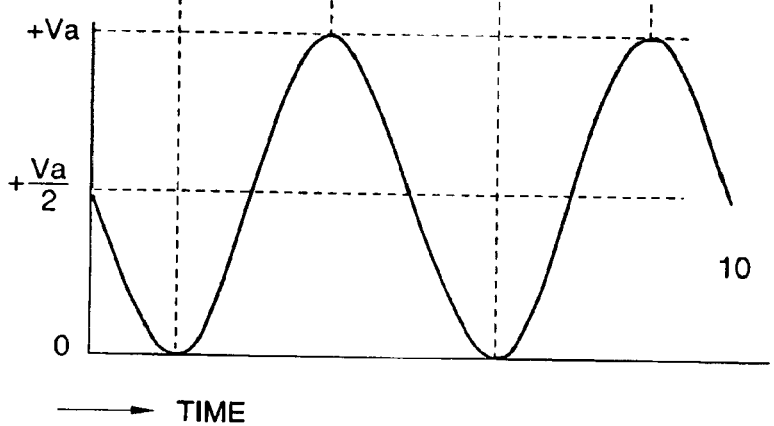
FIG. 4B is a chart showing a waveform of AC voltage supplied from a second AC power supply as shown in FIG. 2.

FIG. 4A shows a waveform of the AC voltage supplied from the first AC power supply 9. FIG. 4B shows a waveform of the AC voltage supplied from the second AC power supply 10. As shown in FIGS. 4A and 4B, the first AC power supply 9 and the second AC power supply 10 have a sinusoidal waveform with the central voltage of +Va/2, and the amplitude of Va. The first AC power supply 9 and the second AC power supply 10 have the same frequency, but a phase shift of 180 degrees. The first AC power supply 9 and the second AC power supply 10 preferably generate an AC voltage with a frequency from tens to 1000 Hz. More preferably, each AC power supply generates an AC voltage with 50 Vrms and 400 Hz. Moreover, the first and second AC power supplies (9, 10) may be the household power supply (100 Vrms, 60 Hz). Furthermore, the first power supply 9 and the second AC power supply 10 may generate an AC voltage of predetermined waveform employing an operational amplifier and a low frequency amplifier.

A method for driving an EL device with the EL device driving device as shown in FIG. 1 will be described below, regarding the applied voltage and the current path. As shown in FIG. 1, an AC voltage supplied from the first AC power supply 9 is input at the input terminal 15 for the first EL driving IC5. The AC voltage passes through the output transistors (Q1, Q2, ..., Qn) as shown in FIG. 2 that are connected to the selected EL devices (L1, L2, ..., Ln), namely, the output transistors (Q1, Q2, ..., Qn) being turned on by the data signal sent to the shift register circuit 3. And an AC voltage as shown in FIG. 4A is applied to one electrodes of the EL devices (L1, L2, ..., Ln) selected via the output terminals (B1, B2, ..., Bn) for the first EL driving IC5, as shown in FIG. 1. On the other hand, an AC voltage supplied from the second AC power supply 10 is input to the input terminal 16 of the second EL driving IC6. The AC voltage passes through the output transistors (Q1, Q2, ..., Qn) as shown in FIG. 2 which is turned on. An AC voltage as shown in FIG. 4B is applied to the other electrodes of the EL devices (L1, L2, ..., Ln) selected via the output terminals (B1, B2, ..., Bn) for the second EL driving IC6, as shown in FIG. 1. In this way, the AC voltage with the amplitude of 2 Va and without superposition of direct current, namely, having the same amplitude in positive and negative regions, is applied between the electrodes of the selected EL devices (L1, L2, ..., Ln).

When the AC voltage supplied from the first AC power supply 9 is higher than the AC voltage supplied from the second AC power supply 10, a current flows through the selected EL devices (L1, L2, ..., Ln) in the following manner. The current flows from the first AC power supply 9 to the selected EL devices (L1, L2, ..., Ln) via the input terminal 15 through the diodes (D1, D2 ..., Dn) of the first EL driving IC5, and via the output terminals (B1, B2, ..., Bn) of the first EL driving IC5. And the current flows from the selected EL devices (L1, L2, ..., Ln) to the second AC power supply 10 via the output terminals (B1, B2, ..., Bn) of the second EL driving IC6 through the output transistors (Q1, Q2, ..., Qn) being tuned on for the second EL driving IC 6, via the input terminal 16. On the other hand, when the AC voltage supplied from the first AC power supply 9 is lower than the AC voltage supplied from the second AC power supply 10, a current flows through the selected EL devices (L1, L2, ..., Ln) in the following manner. The current flows from the second AC power supply 10 to the selected EL devices (L1, L2, ..., Ln) via the input terminal 16 through the diodes (D1, D2 ..., Dn) of the second EL driving IC6, and via the output terminals (B1, B2, ..., Bn) of the second EL driving IC6. And the current flows from the selected EL devices (L1, L2, ..., Ln) to the first AC power supply 9 via the output terminals (B1, B2, ..., Bn) of the first EL driving IC5 through the output transistors (Q1, Q2, ..., Qn) being tuned on for the first EL driving IC5, via the input terminal 15. In this way, the alternating current flows through the selected EL devices (L1, L2, ..., Ln) to which an AC voltage of sinusoidal wave with the amplitude of 2 Va and without superposition of direct current is applied so that the selected EL devices (L1, L2, ..., Ln) are lightened.

As described above, according to the first embodiment of the invention, the alternating current can be tuned on or off using a switching element composed of the output transistors and the diodes connected in parallel to the output transistors. Accordingly, a plurality of EL devices can be driven employing a sinusoidal wave without superposition of direct current, without shortening the life of EL devices, and a number of switches for driving a number of EL devices can be integrated (IC). Moreover, the general-purpose ICs containing a number of switches as this EL driving IC can be used. Accordingly, a number of EL devices can be driven with a small and cheap circuit configuration and without shortening the life.

Second Embodiment

In a second embodiment of the invention, the EL driving IC5 (or 6) as shown in FIG. 2 or 3 is connected to one electrodes of a plurality of EL devices, and the AC power supply is directly connected to the other electrodes.

Figure 5:
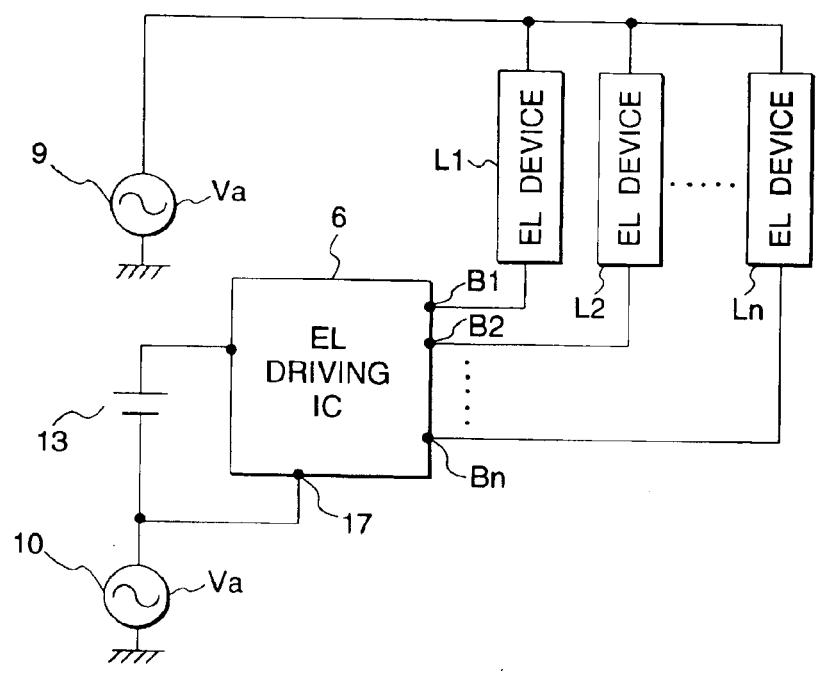
FIG. 5 is a circuit diagram showing the configuration of an EL device driving device according to a second embodiment of the invention.

FIG. 5 is a circuit diagram showing the configuration of an EL device driving device according to the second embodiment of the invention. As shown in FIG. 5, the EL device driving device according to the second embodiment comprises a plurality of EL devices (L1, L2, ..., Ln) having two electrodes, an EL driving IC6 at least having a plurality of output terminals (B1, B2, ..., Bn) connected to one electrodes of the plurality of EL devices (L1, L2, ..., Ln) and an input terminal 17, a first AC power supply 9 for supplying an AC voltage of sinusoidal wave, with one electrode connected to the other electrodes of the plurality of EL devices (L1, L2, ..., Ln) and the other electrode connected to a ground potential point, and a second AC power supply 10 for supplying an AC voltage of sinusoidal wave having the same waveform as the AC voltage supplied by the first AC power supply 9 and shifted in phase 180 degrees, with one electrode connected to the input terminal 17 of the EL driving IC6 and the other electrode connected to the ground potential point. In FIG. 5, a DC power supply 13 supplies an electric power required for the operation of the EL driving IC6.

The EL driving IC6 has the same configuration as described in the first embodiment and shown in FIG. 2 or 3. Namely, the EL driving IC6 comprises a plurality of output transistors (Q1, Q2, ..., Qn or F1, F2, ..., Fn), a plurality of diodes (D1, D2, ..., Dn) respectively connected in parallel to the plurality of output transistors (Q1, Q2, ..., Qn or F1, F2, ..., Fn), a latch circuit 4 connected to the control electrodes of the plurality of output transistors (Q1, Q2, ..., Qn or F1, F2, ..., Fn), and a shift register circuit 3 connected to the latch circuit 4. One electrodes of the plurality of output transistors (Q1, Q2, ..., Qn or F1, F2, ..., Fn) are connected to a plurality of output terminals (B1, B2, ..., Bn), respectively, and the other electrodes are connected to the input terminal 17.

The control data accumulated in the shift register circuit 3 is received into the latch circuit 4 which receives a latch signal in accordance with a clock signal synchronized with the data signal, and held. Each output transistor (Q1, Q2, ..., Qn) is turned on or off in accordance with the control data held in the latch circuit 4 connected to a control electrode of each output transistor (Q1, Q2, ..., Qn).

The output transistors may be preferably the bipolar transistors (Q1, Q2, ..., Qn) or the field effect transistors (F1, F2, ..., Fn). The field effect transistors may be junction type field effect transistors or MOS type field effect transistors (F1, F2, ..., Fn). Diodes (D1, D2, ..., Dn) are connected in parallel between emitter and collector in the case of the bipolar transistors (Q1, Q2, ..., Qn), or between source and drain in the case of the field effect transistors. A forward direction of the diodes (D1, D2, ..., Dn) is defined as one from the emitter to the collector in the case of the npn bipolar transistors (Q1, Q2, ..., Qn), or from the source to the drain in the case of the n-channel MOS type field effect transistors (F1, F2, ..., Fn). When the polarity of these transistors is reversed, the forward direction of the diodes (D1, D2, ..., Dn) is also reversed. The control electrode means the base electrode in the case of the bipolar transistors (Q1, Q2, ..., Qn), or the gate electrode in the case of the field effect transistors (F1, F2, ..., Fn). In the second embodiment, the output transistors use the npn bipolar transistors (Q1, Q2, ..., Qn), and the forward direction of the diodes (D1, D2, ..., Dn) is defined as one from the input terminal 17 to the output terminals (B1, B2, ..., Bn) The EL driving IC6 operates on an AC voltage supplied from the second AC power supply 10 with respect to the ground potential. Accordingly, the shift register circuit 3 and the latch circuit 4 can receive the data signal, the clock signal and the latch signal from the outside through a photo-coupler or an insulating transformer due to the necessity of electrical insulation in the same manner as with the first embodiment.

The AC voltages supplied from the first AC power supply 9 and the second AC power supply 10 have a sinusoidal waveform with the central voltage of +Va/2, and the amplitude of Va, as described in the first embodiment and shown in FIGS. 4A and 4B. Also, the first AC power supply 9 and the second AC power supply 10 have the same frequency, but a phase shift of 180 degrees. The first AC power supply 9 and the second AC power supply 10 preferably generate an AC voltage with a frequency from tens to 1000 Hz. More preferably, each AC power supply generates an AC voltage with 50 Vrms and 400 Hz. Moreover, the first AC power supply 9 and the second AC power supply 10 may be the household power supply (100 Vrms, 60 Hz), or may generate an AC voltage of predetermined waveform employing an operational amplifier and a low frequency amplifier.

A method for driving an EL device with the EL device driving device as shown in FIG. 5 will be described below, regarding the applied voltage and the current path. An AC voltage of FIG. 4A supplied from the first AC power supply 9 is directly applied to one electrodes of all the EL devices (L1, L2, ..., Ln). On the other hand, an AC voltage of FIG. 4B supplied from the second AC power supply 10 is input to the input terminal 17. The AC voltage passes through the output transistors (Q1, Q2, ..., Qn) being turned on for the EL driving IC6. And the AC voltage is applied to the other electrodes of the EL devices (L1, L2, ..., Ln) selected via the output terminals (B1, B2, ..., Bn). In this way, the AC voltage with the amplitude of 2 Va and without superposition of direct current, namely, having the same amplitude in positive and negative regions, is applied between the electrodes of the selected EL devices (L1, L2, ..., Ln).

When the AC voltage supplied from the first AC power supply 9 is higher than the AC voltage supplied from the second AC power supply 10, a current flows through the selected EL devices (L1, L2, ..., Ln) directly from the first AC power supply 9. And the current flows from the selected EL devices (L1, L2, ..., Ln) to the second AC power supply 10 via the output terminals (B1, B2, ..., Bn) through the output transistors (Q1, Q2, ..., Qn) being tuned on for the EL driving IC6, via the input terminal 17. Also, an inverse voltage is applied to the output transistors connected to the EL devices (L1, L2, ..., Ln) not selected, namely, the diodes (D1, D2, ..., Dn) connected in parallel to the output transistors (Q1, Q2, ..., Qn) being turned off to cause an infinite resistance, so that no current flows. On the other hand, if the AC voltage supplied from the first AC power supply 9 is lower than the AC voltage supplied from the second AC power supply 10, a current flows from the second AC power supply 10 via the input terminal 17 through the diodes (D1, D2 ..., Dn) to the selected EL devices (L1, L2, ..., Ln) of the EL driving IC6, and via the output terminals (B1, B2, ..., Bn). And the current flows from the selected EL devices (L1, L2, ..., Ln) to the first AC power supply 9. Also, a forward voltage is applied to the diodes (D1, D2, ..., Dn) connected in parallel to the output transistors (Q1, Q2, ..., Qn) being turned off, so that a current flows. Namely, a current also flows through the EL devices (L1, L2, ..., Ln) unselected. However, since the EL devices (L1, L2, ..., Ln) are small capacity condensers, and a voltage is only applied in a forward direction of the diodes, the EL devices (L1, L2, ..., Ln) are always charged at about +Va. Namely, it does not occur that the forward current of the diodes only flows through the EL devices (L1, L2, ..., Ln). Accordingly, the EL devices (L1, L2, ..., Ln) unselected are not lightened. Since the life of the EL devices (L1, L2, ..., Ln) is hardly shortened owing to charged state, there is no problem in practice. Accordingly, the selected EL devices (L1, L2, ..., Ln) can be only lightened without having influence on the life of the EL devices (L1, L2, ..., Ln).

As described above, according to the second embodiment of the invention, the alternating current can be tuned on or off using a switching element composed of the output transistors and the diodes connected in parallel to the output transistors in the same manner as with the first embodiment. Accordingly, a plurality of EL devices can be driven employing a sinusoidal wave without superposition of direct current, without shortening the life of EL devices, and a number of switches for driving a number of EL devices can be integrated (IC). Moreover, the general-purpose ICs containing a number of switches as this EL driving IC can be used. Accordingly, a number of EL devices can be driven with a small and cheap circuit configuration and without shortening the life.

Further, the circuit configuration, which has the EL driving IC connected to one electrodes of the EL devices, can be simplified while the area for making the circuit is suppressed to about one-half.

Third Embodiment

In a third embodiment of the invention, the EL driving IC5 (or 6) as shown in FIG. 2 or 3 is connected to one electrodes of a plurality of EL devices, and the AC power supply is directly connected to the other electrodes. Further, only one AC power supply is employed.

Figure 6:
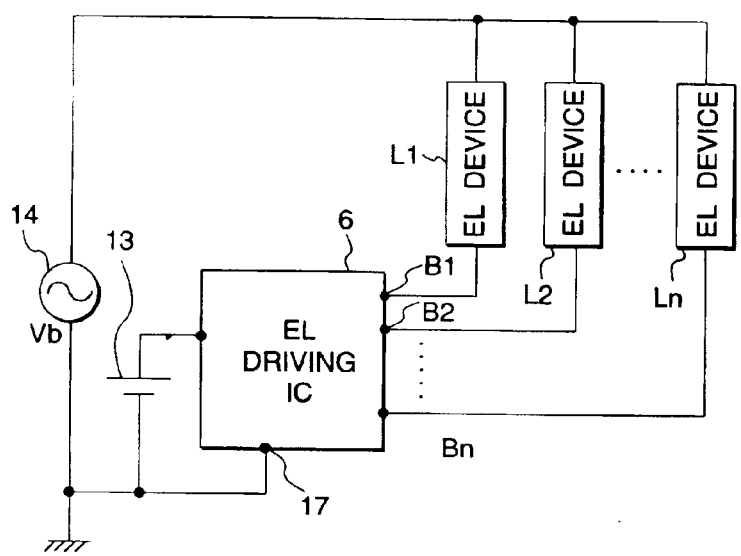
FIG. 6 is a circuit diagram showing the configuration of an EL device driving device according to a third embodiment of the invention.

FIG. 6 is a circuit diagram showing the configuration of an EL device driving device according to the third embodiment of the invention. As shown in FIG. 6, the EL device driving device according to the third embodiment comprises a plurality of EL devices (L1, L2, ..., Ln) having two electrodes, an EL driving IC6 at least having a plurality of output terminals (B1, B2, ..., Bn) connected to one electrodes of the plurality of EL devices (L1, L2, ..., Ln) and an input terminal 17 connected to the ground potential point, and an AC power supply 14 for supplying an AC voltage of sinusoidal wave without superposition of direct current, with one electrode connected to the other electrodes of the plurality of EL devices (L1, L2, ..., Ln) and the other electrode connected to the ground potential point. In FIG. 6, a DC power supply 13 supplies an electric power required for the operation of the EL driving IC6.

The EL driving IC6 has the same configuration as described in the first embodiment and shown in FIG. 2 or 3. Namely, the EL driving IC6 comprises a plurality of output transistors (Q1, Q2, ..., Qn or F1, F2, ..., Fn), a plurality of diodes (D1, D2, ..., Dn) respectively connected in parallel to the plurality of output transistors (Q1, Q2, ..., Qn or F1, F2, ..., Fn), a latch circuit 4 connected to the control electrodes of the plurality of output transistors (Q1, Q2, ..., Qn or F1, F2, ..., Fn), and a shift register circuit 3 connected to the latch circuit 4. One electrodes of the plurality of output transistors (Q1, Q2, ..., Qn or F1, F2, ..., Fn) are connected to a plurality of output terminals (B1, B2, ..., Bn), respectively and the other electrodes are connected to the input terminal 17.

The control data accumulated in the shift register circuit 3 is received into the latch circuit 4 which receives a latch signal in accordance with a clock signal synchronized with the data signal, and held. Each output transistor (Q1, Q2, ..., Qn) is turned on or off in accordance with the control data held in the latch circuit 4 connected to a control electrode of each output transistor (Q1, Q2, ..., Qn).

The output transistors may be preferably the bipolar transistors (Q1, Q2, ..., Qn) or the field effect transistors (F1, F2, ..., Fn) Diodes (D1, D2, ..., Dn) are connected in parallel between emitter and collector in the case of the bipolar transistors (Q1, Q2, ..., Qn), or between source and drain in the case of the field effect transistors. A forward direction of the diodes (D1, D2, . . . , Dn) is defined as one from the emitter to the collector in the case of the npn bipolar transistors (Q1, Q2, . . . , Qn), or from the source to the drain in the case of the n-channel MOS type field effect transistors (F1, F2, . . . , Fn). When the polarity of these transistors is reversed, the forward direction of the diodes (D1, D2, . . . , Dn) is also reversed. The control electrode means the base electrode in the case of the bipolar transistors (Q1, Q2, . . . , Qn), or the gate electrode in the case of the field effect transistors (F1, F2, . . . , Fn). In the third embodiment, the output transistors use the npn bipolar transistors (Q1, Q2, . . . , Qn), and the forward direction of the diodes (D1, D2, . . . , Dn) is defined as one from the input terminal 17 to the output terminals (B1, B2, . . . , Bn).

In the third embodiment, unlike the first and second embodiments, the EL driving IC6 is operated on the ground potential. Accordingly, there is no need of employing the photo-coupler or the insulating transformer for the shift register circuit 3 and the latch circuit 4 to receive the data signal, the clock signal and the latch signal from the outside.

Figure 7:
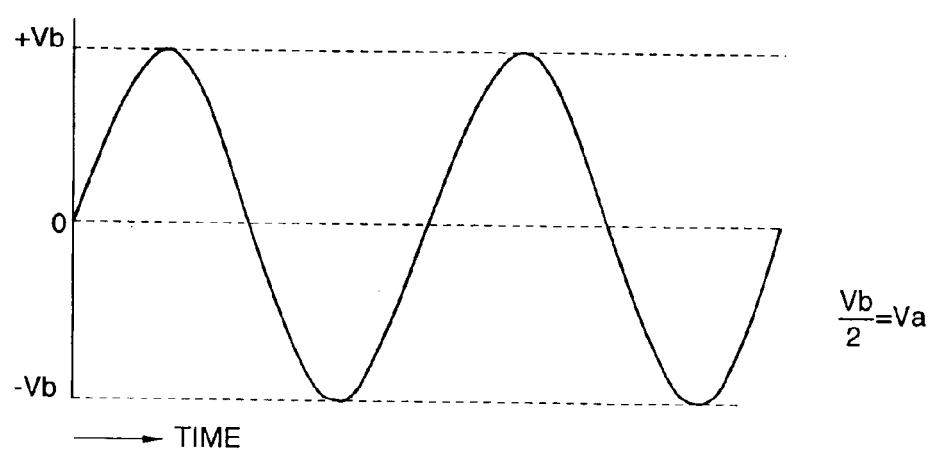
FIG. 7 is a chart showing a waveform of AC voltage supplied from an AC power supply as shown in FIG. 6.

FIG. 7 is a chart showing the waveform of an AC voltage supplied from the AC power supply 14 as shown in FIG. 6. As shown in FIG. 7, the AC voltage supplied from the AC power supply 14 has a sinusoidal waveform without superposition of direct current, namely, having the same amplitude in positive and negative regions. As compared with the waveform of the AC voltage supplied from the first and second AC power supplies (9, 10) as shown in FIG. 4, the frequency is the same but the amplitude is double (Vb=2 Va). The frequency of the AC voltage supplied from the AC power supply 14 is preferably tens to 1000 Hz. More preferably, the AC power supply generates an AC voltage with 100 Vrms and 400 Hz. Moreover, the AC power supply 14 may be the household power supply (100 Vrms, 60 Hz), or may generate an AC voltage generated employing an operational amplifier and a low frequency amplifier.

When the AC voltage supplied from the AC power supply 14 is plus, a current flows through the EL devices (L1, L2, . . . , Ln) directly from the AC power supply 14. And the current flows from the EL devices (L1, L2, . . . , Ln) to the ground potential point via the output terminals (B1, B2, . . . , Bn) through the output transistors (Q1, Q2, . . . , Qn) being tuned on as shown in FIG. 2, via the input terminal 17. Also, no current flows through the unselected EL devices (L1, L2, . . . , Ln), because the output transistors (Q1, Q2, . . . , Qn) are turned off, and an inverse voltage is applied to the diodes (D1, D2, . . . , Dn). On the other hand, if the AC voltage is minus, a current flows from the ground potential point to the AC power supply 14 via the input terminal 17 through the diodes (D1, D2, . . . , Dn) as shown in FIG. 2, and via the output terminals (B1, B2, . . . , Bn) to the selected EL devices (L1, L2, . . . , Ln). And the current flows from the selected EL devices (L1, L2, . . . , Ln). Also, a forward voltage is applied to the diodes (D1, D2, . . . , Dn), so that a current flows through the unselected EL devices (L1, L2, . . . , Ln). However, since the EL devices (L1, L2, . . . , Ln) are small capacity condensers, and a voltage is only applied in a forward direction of the diodes, the EL devices (L1, L2, . . . , Ln) are always charged at about +Va. Namely, it does not occur that the forward current of the diodes only flows through the EL devices (L1, L2, . . . , Ln). Accordingly, the EL devices (L1, L2, . . . , Ln) unselected are not lightened. Since the life of the EL devices (L1, L2, . . . , Ln) is hardly shortened owing to charged state, there is no problem in practice. Accordingly, the selected EL devices (L1, L2, . . . , Ln) can be only lightened without having influence on the life of the EL devices (L1, L2, . . . , Ln).

As described above, according to the third embodiment of the invention, the alternating current can be tuned on or off using a switching element composed of the output transistors and the diodes connected in parallel to the output transistors in the same manner as with the first and second embodiments. Accordingly, a plurality of EL devices can be driven employing a sinusoidal wave without superposition of direct current, without shortening the life of EL devices, and a number of switches for driving a number of EL devices can be integrated (IC). Moreover, the general-purpose ICs containing a number of switches as this EL driving IC can be used. Accordingly, a number of EL devices can be driven with a small and cheap circuit configuration and without shortening the life.

Further, the circuit configuration, which has the EL driving IC connected to one electrodes of the EL devices, can be simplified while the area for making the circuit is suppressed to about one-half.

Further, the EL driving IC can be operated on the ground potential, there is no need of the electrical insulation through a photo-coupler or an insulating transformer to receive the data signal, the clock signal and the latch signal from the outside. Only one AC power supply may be used. A positive voltage power source and a negative voltage power source are required for supplying the AC power voltage, and the voltage applied on the amplifier for producing the sinusoidal wave may be doubled.

Fourth Embodiment

In a fourth embodiment of the invention, an AC power supply is connected directly to one electrodes of a plurality of EL devices, and a different circuit from the EL driving IC5 (or 6) as shown in FIG. 2 or 3 is connected to the other electrodes. Further, only one AC power supply is employed.

Figure 8:
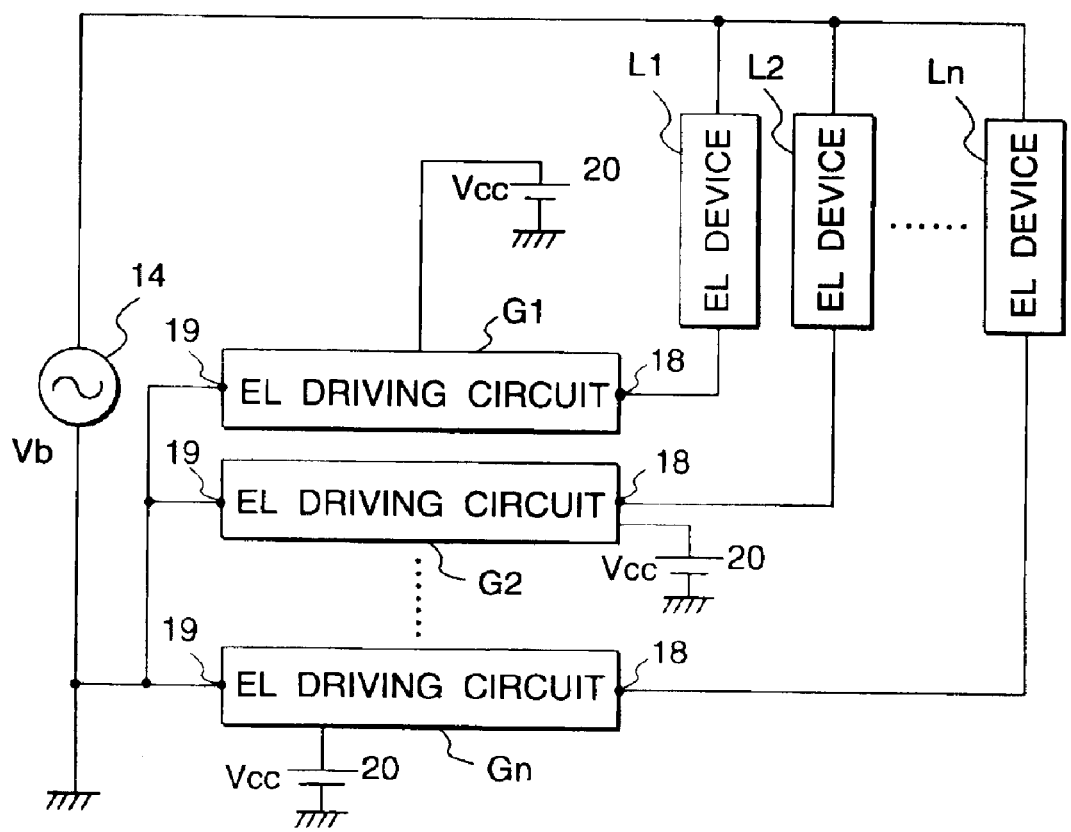
FIG. 8 is a circuit diagram showing the configuration of an EL device driving device according to a fourth embodiment of the invention.

FIG. 8 is a circuit diagram showing the configuration of an EL device driving device according to a fourth embodiment of the invention. As shown in FIG. 8, the EL device driving device according to the fourth embodiment comprises a plurality of EL devices (L1, L2, . . . , Ln) having two electrodes, an AC power supply 14 for supplying an AC voltage of sinusoidal wave without superposition of direct current, with one electrode connected to one electrodes of the plurality of EL devices (L1, L2, . . . , Ln), and the other electrode connected to a ground potential point, and a plurality of EL driving circuits (G1, G2, . . . , Gn) at least having the output terminals 18 connected to the other electrodes of the plurality of EL devices (L1, L2, . . . , Ln), and the input terminals 19 connected to the ground potential point.

Figure 9:
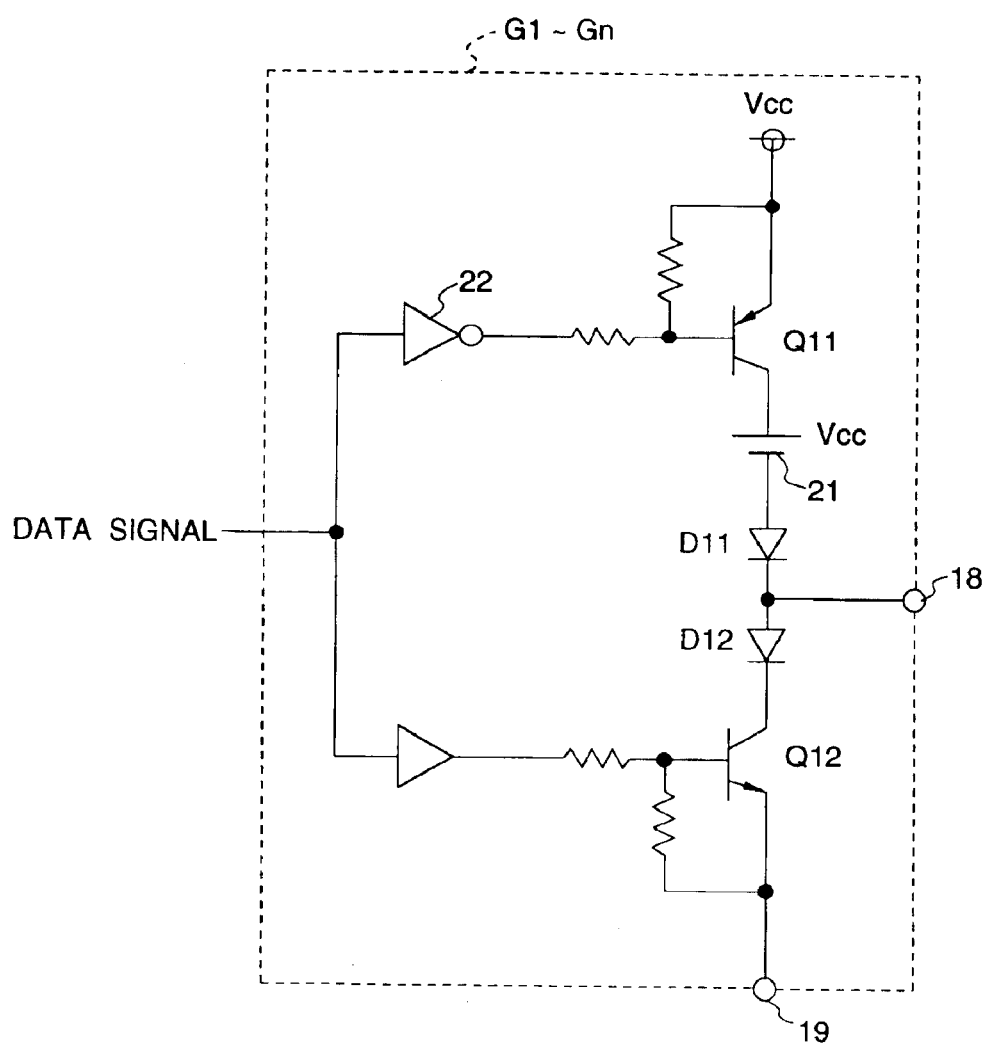
FIG. 9 is a circuit diagram showing the configuration of another EL driving circuit as shown in FIG. 8 (No.1).

As shown in FIG. 9, the EL driving circuits (G1, G2, . . . , Gn) have the same configuration each other. Namely, an EL driving circuit G1 corresponding to an EL device L1 comprises a pnp transistor Q11 having an emitter connected to a DC power source 20 for supplying an electric power (=Vcc) required for the operation of the EL driving circuit G1, a voltage drop element 21 such as a Zener diode or resistor which produces a voltage drop of Vcc that is a potential of the DC power source 20, with the plus side connected to a collector of the pnp transistor Q11, a first diode D11 having an anode connected to the minus side of the voltage drop element 21, a second diode D12 having an anode connected to a cathode of the first diode D11, and an npn transistor Q12 having a collector connected to the cathode of the second diode D12. An output terminal 18 of the EL driving circuit G1 is connected at a junction between the cathode of the first diode D11 and the anode of the second diode D12.

The emitter of the npn transistor Q12 is connected to the input terminal 19, the emitter of the pnp transistor Q11 is connected to the base of the pnp transistor Q11 to which a data signal for controlling the lightening of the EL device L1 is input via an inversion circuit 22. The emitter of the npn transistor Q12 is connected to the base of the npn transistor Q12 to which a data signal for controlling the lightening of the EL device L1 is input. Other EL driving circuits (G2, . . . , Gn) corresponding to other EL devices (L2, . . . , Ln) are configured in the same way as the EL driving circuit G1 corresponding to the EL device L1 as described above.

In this connection, in the fourth embodiment of the invention, a first energizing circuit is made up of the DC power source 20, the pnp transistor Q11, the voltage drop element 21, and the first diode D11 for the EL driving circuit (G1, G2, . . . , Gn). A second energizing circuit is made up of the second diode D12 and the npn transistor Q12 for the EL driving circuit (G1, G2, . . . , Gn). An energizing control circuit for turning on or off the first and second energizing circuits is made up of the input terminal 19 and the inversion circuit 22.

In the fourth embodiment, the EL driving circuits (G1, G2, . . . , Gn) operate on the ground potential in the same manner as the EL driving IC6 for the third embodiment. Accordingly, there is no need of using a photo-coupler or an insulating transformer for the pnp transistor Q11 or the npn transistor Q12 to receive the data signal from the outside.

Also, in the fourth embodiment, the AC voltage supplied from the AC power supply 14 has the same waveform of FIG. 7 as the AC voltage supplied from the AC power supply 14 in the third embodiment. The frequency of the AC voltage supplied from the AC power supply 14 is preferably tens to 1000 Hz. More preferably, the AC power supply generates an AC voltage with 100 Vrms and 400 Hz. Moreover, the AC power supply 14 may be the household power supply (100 Vrms, 60 Hz), or may generate an AC voltage employing an operational amplifier and a low frequency amplifier.

When the data signal for controlling the lightening of the EL device L1 is turned off, the emitter-collector of the pnp transistor Q11 having no bias applied on the base is placed in the nonconducting state because the potential is equal to Vcc of the DC power source 20 owing to the inversion circuit 22. Also, the emitter-collector of the npn transistor Q12 in which the data signal being turned off directly acts on the base is placed in the nonconducting state, so that the EL driving circuit G1 becomes an open circuit.

On the other hand, when the data signal for controlling the lightening of the EL device L1 is turned on, the emitter-collector of the pnp transistor Q11 having a bias applied on the base is in conduction, because the potential falls to an OFF level of the data signal owing to the inversion circuit 22. Also, the emitter-collector of the npn transistor Q12 in which the data signal being turned on directly acts on the base is placed in conduction, so that the EL driving circuit G1 becomes a closed circuit.

Then, owing to a voltage drop of Vcc in the voltage drop element 21 having the plus side connected to the DC power source 20 via the pnp transistor Q11, the cathode of the first diode D11 having the anode connected to the minus side of the voltage drop element 21 becomes the ground potential, and the anode of the second diode D12 having the cathode connected via the npn transistor Q12 to the ground potential point becomes the ground potential, so that the output terminal 18 of the EL driving circuit G1 becomes the ground potential.

Accordingly, while the AC voltage of sinusoidal wave supplied from the AC power supply 14 is at a minus potential, an alternating current flows through the EL device L1 in a direction from the output terminal 18 at the ground potential that is relatively higher to the AC power supply 14 that is relatively lower. Conversely, while the AC voltage of sinusoidal wave supplied from the AC power supply 14 is at a plus potential, an alternating current flows through the EL device L1 in a direction from the AC power supply 14 at a positive potential that is relatively higher to the output terminal 18 at the ground potential that is relatively lower, so that the EL device L1 is lightened by the AC voltage.

Therefore, since the ON data signal is input into the EL driving circuits (G1, G2, . . . , Gn) corresponding to the selected EL devices (L1, L2, . . . , Ln), an alternating current with the energizing direction alternately changing in a direction from the output terminal 18 to the power supply 14 or a direction from the AC power supply 14 to the output terminal 18 flows through the EL devices (L1, L2, . . . , Ln), so that the selected EL devices (L1, L2, . . . , Ln) are lightened. Also, the unselected EL devices (L1, L2, . . . , Ln) have the emitter-collector of the pnp transistor Q11 and the npn transistor Q12 in the nonconducting state, and the EL driving circuit G1 is placed in the open circuit state, so that no current flows through the EL devices (L1, L2, . . . , Ln). Accordingly, the unselected EL devices (L1, L2, . . . , Ln) are not lightened.

As described above, according to the fourth embodiment of the invention, the alternating current can be tuned on or off using the first and second energizing circuits having a diode for defining the energizing direction between the EL device and the AC power supply and the energizing control circuit for turning on or off them. Accordingly, a plurality of EL devices can be driven employing a sinusoidal wave without superposition of direct current, without shortening the life of EL devices, and a number of switches for driving a number of EL devices can be integrated (IC). Moreover, the general-purpose ICs containing a number of switches as this EL driving IC can be used. Accordingly, a number of EL devices can be driven with a small and cheap circuit configuration and without shortening the life.

Further, the circuit configuration, which has the EL driving circuit connected to one electrodes of the EL devices, can be simplified while the area for making the circuit is suppressed to about one-half.

Further, the EL driving circuit can be operated on the ground potential, there is no need of the electrical insulation through a photo-coupler or an insulating transformer to receive the data signal from the outside. Only one AC power supply may be used. A positive voltage power source and a negative voltage power source are required for supplying the AC power voltage, and the voltage applied on the amplifier for producing the sinusoidal wave may be doubled.

Figure 10:
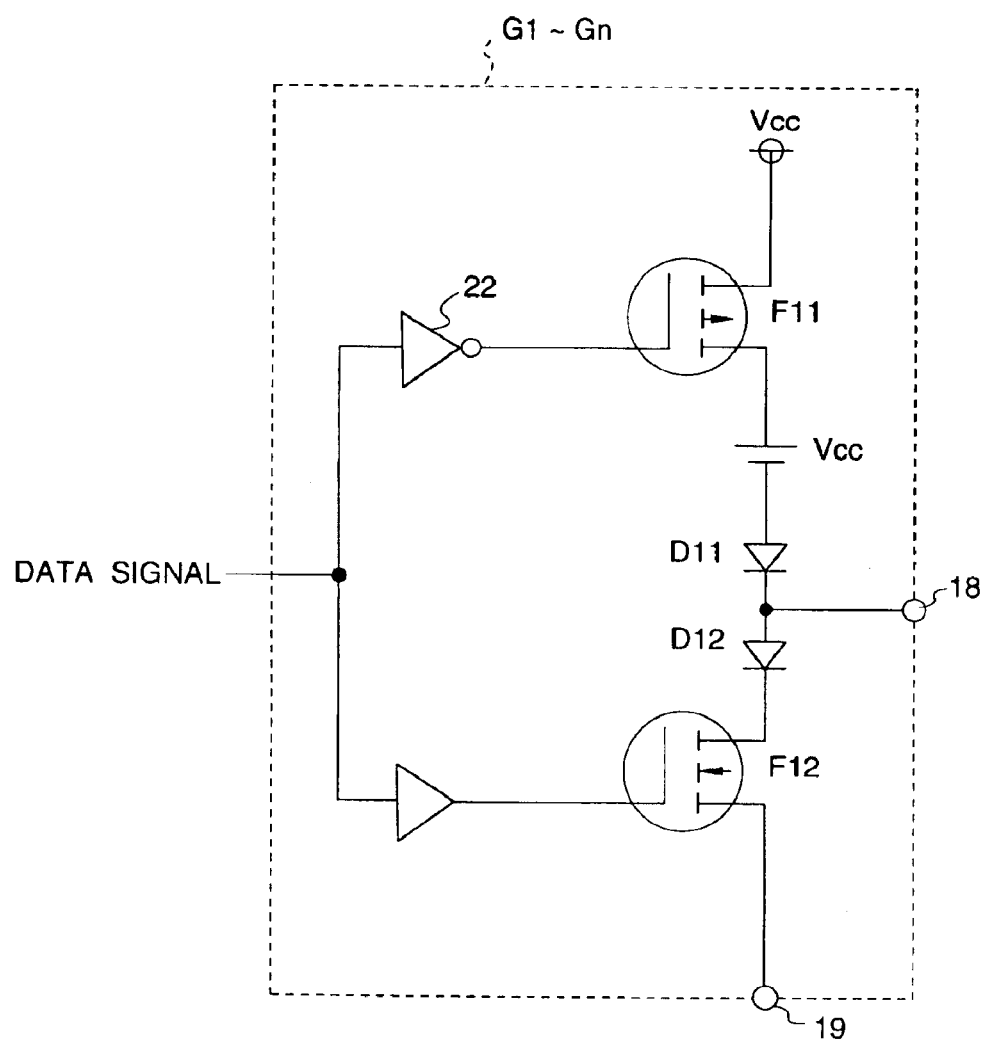
FIG. 10 is a circuit diagram showing the configuration of another EL driving circuit as shown in FIG. 8 (No.2).

The EL driving circuits (G1, G2, . . . , Gn) maybe configured employing a p-channel field effect transistor F1 and an n-channel field effect transistor F12, as shown in FIG. 10, instead of the pnp transistor Q11 and the npn transistor Q12.

Figure 11:
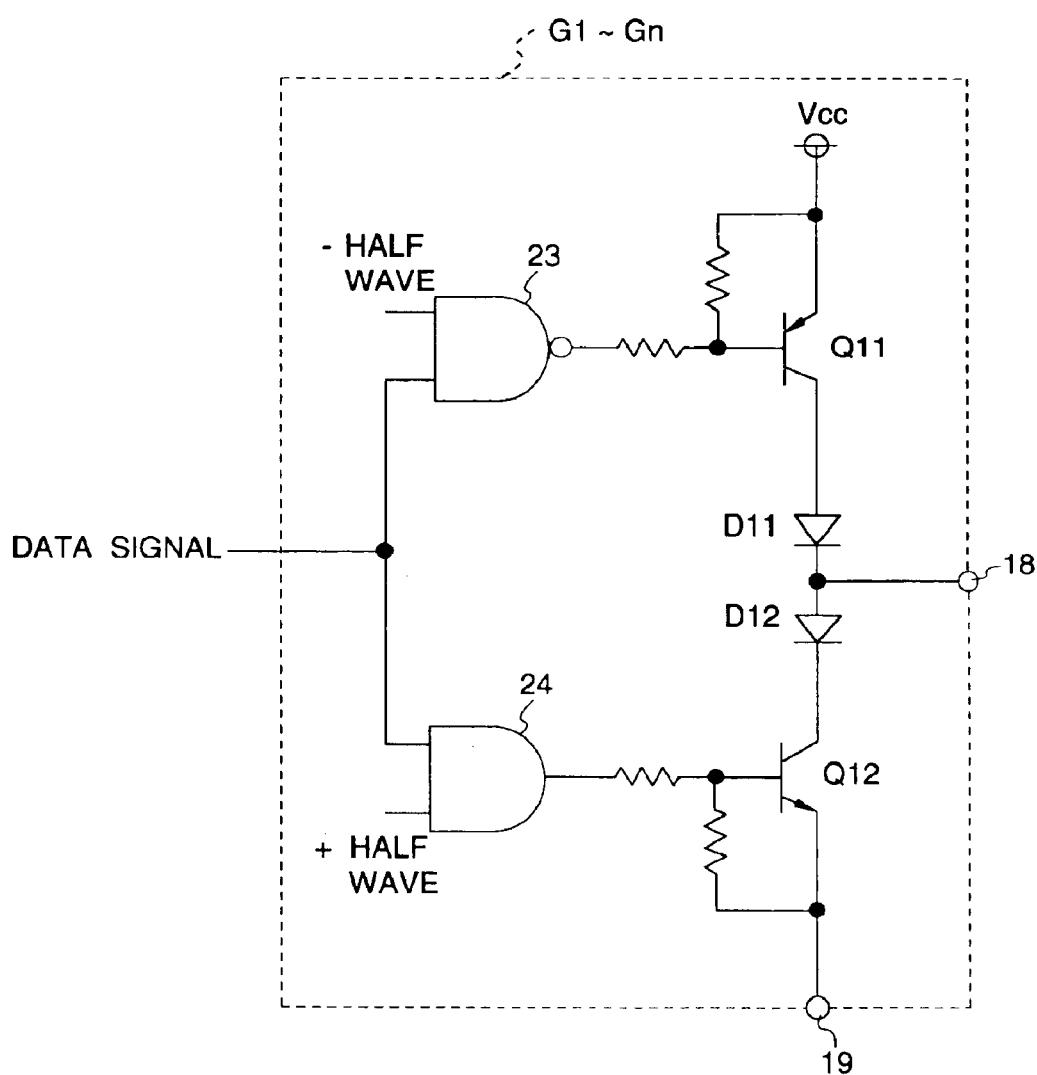
FIG. 11 is a circuit diagram showing the configuration of another EL driving circuit as shown in FIG. 8 (No.3).

Further, the EL driving circuits (G1, G2, . . . , Gn) may be configured, omitting the voltage drop element 21, in such a way that the data signal from the outside acts on the base of the pnp transistor Q11 via a NAND circuit 23, in place of the inversion circuit 22, and the data signal from the outside acts on the base of the npn transistor Q12 via an AND circuit 24, as shown in FIG. 11. The data signal from the outside and the AC voltage of sinusoidal wave in a negative (minus) potential area that is supplied from the AC power supply 14 are input into the NAND circuit 23, and the data signal from the outside and the AC voltage of sinusoidal wave in a positive (plus) potential area that is supplied from the AC power supply 14 are input into the AND circuit 24, so that the emitter-collector of the pnp transistor Q11 and the emitter-collector of the npn transistor Q12 can be prevented from conducting to cause a through current flow, without relying on the use of the voltage drop element 21.

Figure 12A:
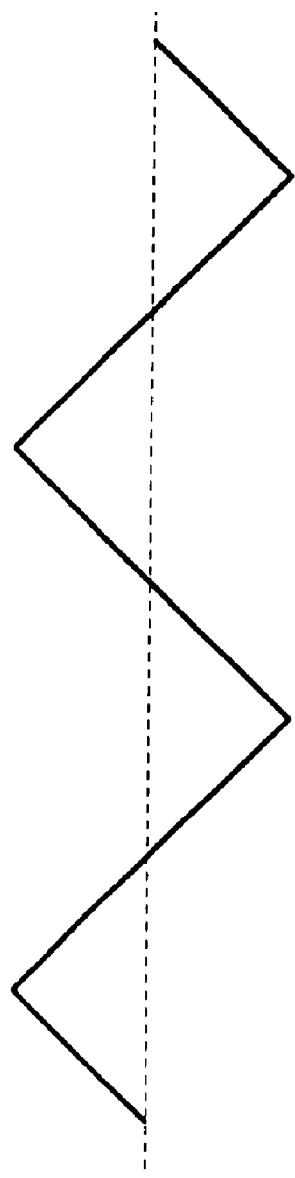
FIGS. 12A to 12C are charts showing another waveform of AC voltage supplied from the AC power supply as shown in FIG. 6.
Figure 12B:
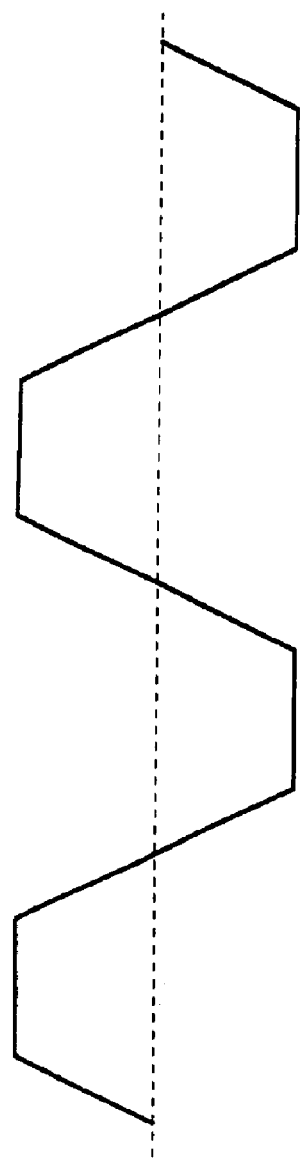
Figure 12C:
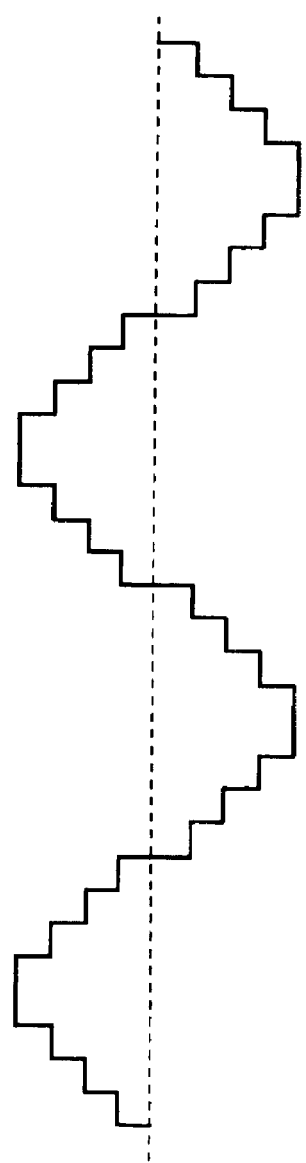
Figure 13:
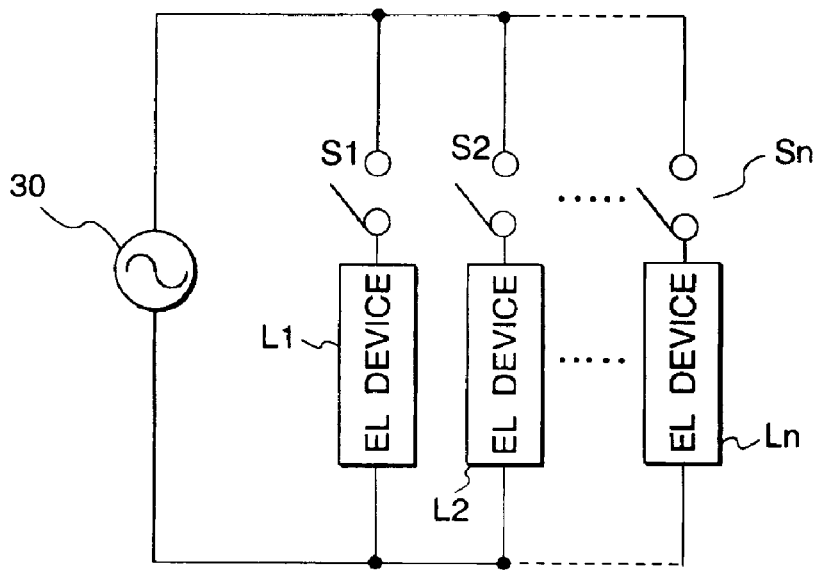
FIG. 13 is a circuit diagram showing the configuration of the related EL device driving device (No.1).
Figure 14:
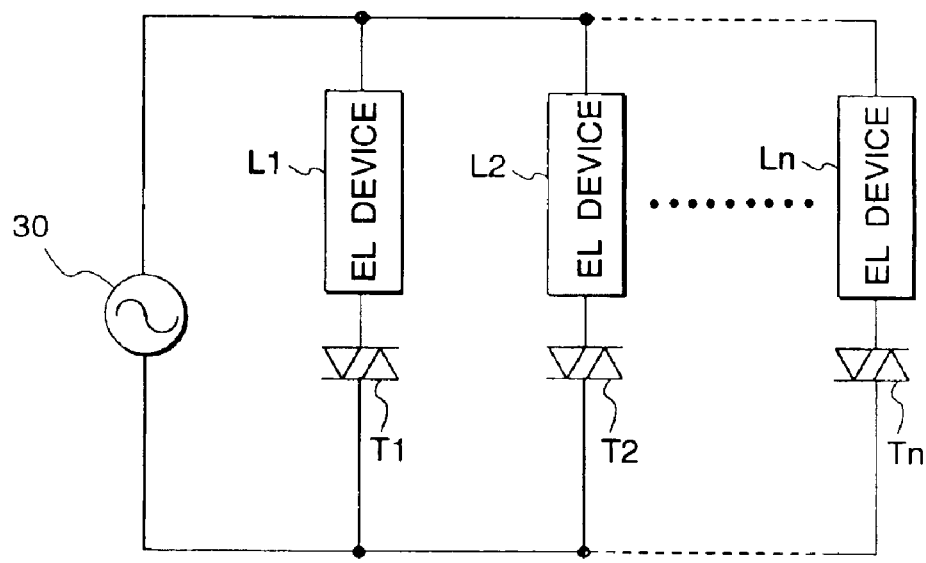
FIG. 14 is a circuit diagram showing the configuration of the related EL device driving device (No.2).
Figure 15:
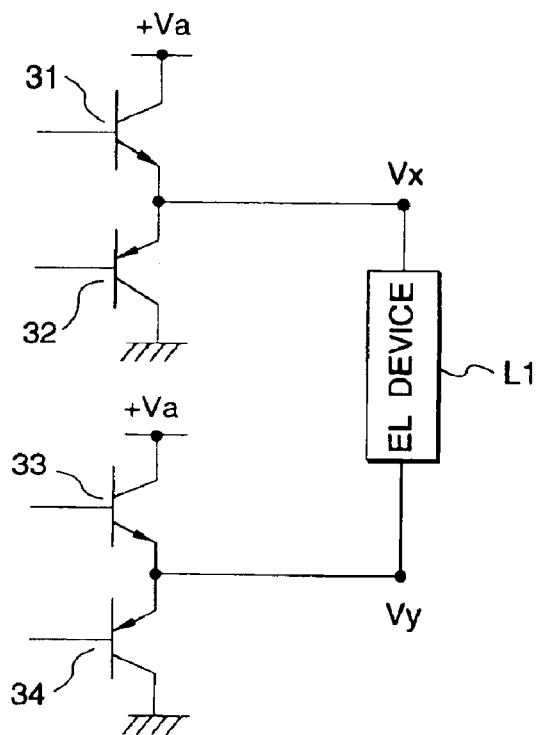
FIG. 15 is a circuit diagram showing the configuration of the related EL device driving device (No.3).
Figure 16:
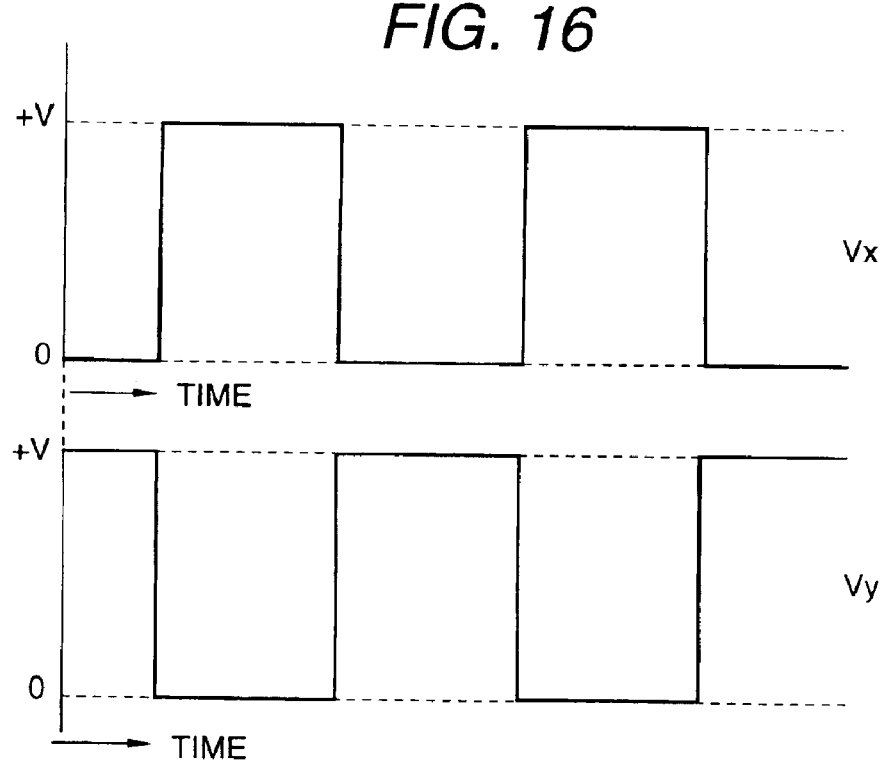
FIG. 16 is a chart showing the waveforms of AC voltage applied on both electrodes of an EL device in FIG. 15.

In the first to fourth embodiments as described above, the AC voltage applied on the EL devices by the first AC power supply 9 and the second AC power supply 10, or the AC power supply 14, is made to have a sinusoidal waveform, as shown in FIG. 7. However, the waveform of AC voltage to be applied is not limited to the sinusoidal shape, but may be a triangular wave, a trapezoidal wave, or a pseudo-sinusoidal wave, other than the rectangular wave, as shown in FIGS. 12A to 12C, for example, so long as the potential is gradually changed without causing significant variation in voltage.

Also, in the first to fourth embodiments as described above, a plurality of EL devices (L1, L2, ..., Ln) are driven corresponding to a plurality of bipolar transistors Q1, Q2, ..., Qn, a plurality of field effect transistors F1, F2, ..., Fn or a plurality of diodes D1, D2, ..., Dn as the output transistors constituting the EL driving ICs 5, 6 and 7, or a plurality of EL driving circuits (G1, G2, ..., Gn). However, the invention is also applicable to such an instance where a single EL device is driven, employing a single output transistor or diode, or a single EL driving circuit constituting the EL driving IC.

As described above, this invention can provide an EL device driving device capable of driving an EL device with a small and cheap circuit configuration, without shortening the life.

Also, this invention can provide an EL device driving method capable of driving an EL device with a small and cheap circuit configuration, without shortening the life.

What is claimed is:

1. An EL device driving device comprising:
an EL device having two electrodes;
a first EL driving IC having a first output terminal connected to one electrode of the EL device, a first input terminal, and a first controller for turning on or off an alternating current flowing between the first output terminal and the first input terminal;
a second EL driving IC having a second output terminal connected to the other electrode of the EL device, a second input terminal, and a second controller for turning on or off an alternating current flowing between the second output terminal and the second input terminal;
a first AC power supply for supplying an AC voltage, one electrode of the first AC power supply being connected to the first input terminal, and the other electrode of the first AC power supply being connected to a ground potential point; and
a second AC power supply for supplying an AC voltage having the same waveform as the AC voltage supplied from the first AC supply, and shifted in phase 180 degrees, one electrode of the second AC power supply being connected to the second input terminal, and the other electrode of the second AC power supply being connected to the ground potential point;
wherein said AC voltages are substantially sinusoidal waveforms.

2. The EL device driving device according to claim 1, wherein the amplitude of the AC voltage supplied from the first AC power supply and the second AC power supply is 50V and its frequency is 400 Hz.

3. The EL device driving device according to claim 1, wherein
the plurality of EL devices are provided;
the first EL driving IC has a plurality of the first output terminals and a plurality of the first controllers;
the second EL driving IC has a plurality of the second output terminals and a plurality of the second controllers;
the plurality of first output terminals are connected to one electrodes of the plurality of EL devices, respectively;
the first controllers are configured to turn on or off the alternating current flowing between each of the plurality of first output terminals and the first input terminal;
the plurality of second output terminals are connected to the other electrodes of the plurality of EL devices; and
the second controllers are configured to turn on or off the alternating current flowing between each of the plurality of second output terminals and the second input terminal.

4. The EL device driving device according to claim 1, wherein
the first EL driving IC includes an output transistor having one electrode connected to the first output and the other electrode connected to the first input terminal, and a diode connected in parallel to the output transistor, and
the second EL driving IC includes an output transistor having one electrode connected to the second output terminal and the other electrode connected to the second input terminal of the second EL driving IC, and a diode connected in parallel to the output transistor.

5. The EL device driving device according to claim 4, wherein the output transistor is a bipolar transistor or a field effect transistor.

6. An EL device driving device comprising:
an EL device having two electrodes;
an EL driving IC having an output terminal connected to one electrode of the EL device, an input terminal, and a controller for turning on or off an alternating current flowing between the output terminal and the input terminal;
a first AC power supply for supplying an AC voltage, one electrode of the first AC power supply being connected to the other electrode of the EL device, and the other electrode of the first AC power supply being connected to a ground potential point; and
a second AC power supply for supplying an AC voltage having the same waveform as the AC voltage supplied from the first AC supply and shifted in phase 180 degrees, one electrode of the second AC power supply being connected to the input terminal of the EL driving IC, and the other electrode of the second AC power supply being connected to the ground potential point;
wherein said AC voltages are substantially sinusoidal waveforms.

7. The EL device driving device according to claim 6, wherein the amplitude of the AC voltage supplied from the first AC power supply and the second AC power supply is 50V and its frequency is 400 Hz.

8. The EL device driving device according to claim 6, wherein
the plurality of EL devices are provided;
the EL driving IC has the plurality of output terminals and the plurality of controllers for turning on or off the alternating current corresponding to the plurality of EL devices, respectively;
the plurality of output terminals for the EL driving IC are connected to one electrodes of the plurality of EL devices, respectively;

the one electrode for the first AC power supply is connected to the other electrodes of the plurality of EL devices;

the controllers are configured to turn on or off the alternating current flowing between each of the plurality of output terminals and the input terminal;

wherein said AC voltages are substantially sinusoidal waveforms.

9. The EL device driving device according to claim 6, wherein the EL driving IC includes an output transistor having one electrode connected to the output terminal of the EL driving IC and the other electrode connected to the input terminal of the EL driving IC, and a diode connected in parallel to the output transistor.

10. The EL device driving device according to claim 9, wherein the output transistor is a bipolar transistor or a field effect transistor.

11. An EL device driving device comprising:

an EL device having two electrodes;

a discrete EL driving IC having an output terminal connected to one electrode of the EL device, an input terminal connected to a ground potential point, and a controller for turning on or off an alternating current flowing between the output terminal and the input terminal; and a discrete AC power supply for supplying an AC voltage without superposition of direct current, one electrode of the AC power supply being connected to the other electrode of the EL device, and the other electrode of the AC power supply being connected to the ground potential point, wherein said AC voltage is a substantially sinusoidal waveform.

12. The EL device driving device according to claim 11, wherein the amplitude of the AC voltage supplied from the AC power supply is 100V and its frequency is 400 Hz.

13. The EL device driving device according to claim 11, wherein the plurality of EL devices are provided;

the EL driving IC has the plurality of output terminals and the plurality of controllers for turning on or off the alternating current corresponding to the plurality of EL devices, respectively;

the plurality of output terminals for the EL driving IC are connected to one electrodes of the plurality of EL devices, respectively;

the one electrode for the AC power supply is connected to the other electrodes of the plurality of EL devices; and the controllers is configured to turn on or off the alternating current flowing between each of the plurality of output terminals and the input terminal.

14. The EL device driving device according to claim 11, wherein the EL driving IC includes an output transistor having one electrode connected to the output terminal of the EL driving IC and the other electrode connected to the input terminal of the EL driving IC, and a diode connected in parallel to the output transistor.

15. The EL device driving device according to claim 14, wherein the output transistor is a bipolar transistor or a field effect transistor.

16. An EL device driving device comprising:

an EL device having two electrodes;

a discrete AC power supply for supplying an AC voltage, one electrode of the AC power supply being connected to one electrode of the EL device, and the other electrode of the AC power supply being connected to a ground potential point; and a discrete EL driving circuit including a first energizing circuit for energizing a first diode connected to the other electrode of the EL device to current in a direction from the EL device to the AC power supply;

a second energizing circuit for energizing a second diode connected to the other electrode of the EL device to pass current in a direction from the AC power supply to the EL device; and an energizing control circuit for turning on or off the first and second energizing circuits in synchronism with a positive or negative change in the AC voltage supplied from the AC power supply;

wherein said AC voltages are substantially sinusoidal waveforms.

17. The EL device driving device according to claim 16, wherein the amplitude of the AC voltage supplied from the AC power supply is 100V and its frequency is 400 Hz.

18. The EL device driving device according to claim 16, wherein the plurality of EL devices are provided;

the plurality of first and second energizing circuits are provided corresponding to the plurality of EL devices, respectively; and the energizing control circuit is configured to turn on or off each of the plurality of first and second energizing circuits corresponding to the plurality of EL devices.

19. The EL device driving device according to claim 16, wherein one electrode of the first diode is connected to the other electrode of the EL device;

the first energizing circuit enables the other electrode of the first diode to be at the ground potential when the first energizing circuit is turned on;

one electrode of the second diode is connected to the other electrode of the EL device; and the other electrode of the second diode is connected to the ground potential point.

20. The EL device driving device according to claim 16, wherein the energizing control circuit turns on the first energizing circuit, and turns off the second energizing circuit, when the AV voltage supplied from the AC power supply is at a negative potential, and the energizing control circuit turns off the first energizing circuit, and turns on the second energizing circuit, when the AV voltage supplied from the AC power supply is at a positive potential.

21. An EL device driving method comprising the steps of:

passing a current from a first AC power supply to one electrode of an EL device through a diode within a first EL driving IC, and from the other electrode of the EL device to a second AC power supply through an output transistor in the on state within a second EL driving IC, when the AC voltage supplied from the first AC power supply is higher than the AC voltage supplied from the second AC power supply with the same waveform as the AC voltage supplied from the first AC power supply and shifted in phase 180 degrees; and passing a current from the second AC power supply to the other electrode of the EL device through a diode connected in parallel to the output transistor within the second EL driving IC, and from one electrode of the EL device to the first AC power supply device through the output transistor in the on state connected in parallel to the diode within the first EL driving IC, when the AC voltage supplied from the first AC power supply is lower than the AC voltage supplied from the second AC power supply;

wherein said AC voltages are substantially sinusoidal waveforms.

22. The EL device driving method according to claim 21, wherein the amplitude of the AC voltage supplied from the first AC power supply and the second AC power supply is 50V and its frequency is 400 Hz.

23. The EL device driving method according to claim 21, wherein the output transistor is a bipolar transistor or a field effect transistor.

24. An EL device driving method comprising the steps of:

passing a current from a first AC power supply to one electrode of an EL device, and from the other electrode of the EL device through an output transistor in on state within an EL driving IC to a second AC power supply, when the AC voltage supplied from the first AC power supply is higher than the AC voltage supplied from the second AC power supply, with the same waveform as the AC voltage supplied from the first AC power supply and shifted in phase 180 degrees; and passing a current from the second AC power supply to the other electrode of the EL device through a diode connected in parallel to the output transistor within the EL driving IC, and from one electrode of the EL device to the first AC power supply, when the AC voltage supplied from the first AC power supply is lower than the AC voltage supplied from the second AC power supply;

wherein said AC voltages are substantially sinusoidal waveforms.

25. The EL device driving method according to claim 24, wherein the amplitude of the AC voltage supplied from the first AC power supply and the second AC power supply is 50V and its frequency is 400 Hz.

26. The EL device driving method according to claim 24, wherein the output transistor is a bipolar transistor or a field effect transistor.

27. An EL device driving method comprising the steps of:

passing a current from a AC power supply to one electrode of an EL device, and from the other electrode of the EL device to the ground potential point through an output transistor in the on state within an EL driving IC, when the AC voltage without superposition of direct current supplied from the AC power supply is higher than a ground potential; and passing a current from the pound potential point to the other electrode of the EL device through a diode connected in parallel to the output transistor in the on state within the EL driving IC, and from one electrode of the EL device to the AC power supply, when the AC voltage supplied from the AC power supply is lower than the ground potential;

wherein said AC voltage is a substantially sinusoidal waveform.

28. The EL device driving method according to claim 27, wherein the amplitude of the AC voltage supplied from the AC power supply is 100V and its frequency is 400 Hz.

29. The EL device driving method according to claim 27, wherein the output transistor is a bipolar transistor or a field effect transistor.

30. The EL device driving device of claim 1, wherein said AC voltage is a sinusoidal waveform.

31. The EL device driving device of claim 6, wherein said AC voltages are sinusoidal waveforms.

32. The EL device driving device of claim 16, wherein said AC voltage is a sinusoidal waveform.

33. The EL device driving method of claim 21, wherein said AC voltages are sinusoidal waveforms.

34. The EL device driving method of claim 24, wherein said AC voltages are sinusoidal waveforms.

35. The EL device driving method of claim 27, wherein said AC voltage is a sinusoidal waveform.

* * * * *